US012724009B2

(12) United States Patent
Chijioke et al.

(10) Patent No.: US 12,724,009 B2
(45) Date of Patent: Sep. 1, 2026

(54) SOUND PRESSURE METROLOGY INSTRUMENT AND DETERMINING SOUND PRESSURE FROM INDEX OF REFRACTION

(71) Applicant: Government of the United States of America, as represented by the Secretary of Commerce, Gaithersburg, MD (US)

(72) Inventors: Akobuije Douglas Eziani Chijioke, Silver Spring, MD (US); Richard Albert Allen, Clarksburg, MD (US); Benjamin James Reschovsky, Cabin John, MD (US); Randall Paul Wagner, Arlington, VA (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 150 days.

(21) Appl. No.: 18/239,327

(22) Filed: Aug. 29, 2023

(65) Prior Publication Data

US 2024/0068990 A1 Feb. 29, 2024

Related U.S. Application Data

(60) Provisional application No. 63/401,735, filed on Aug. 29, 2022.

(51) Int. Cl.
*G01N 29/11* (2006.01)
*G01N 29/24* (2006.01)

(52) U.S. Cl.
CPC ......... *G01N 29/11* (2013.01); *G01N 29/2418* (2013.01); *G01N 2291/015* (2013.01)

(58) Field of Classification Search
CPC ............... G01N 29/11; G01N 29/2418; G01N 2291/015; G01N 21/41; G01N 21/1702; G01N 29/00
See application file for complete search history.

(56) References Cited

U.S. PATENT DOCUMENTS 8,301,029 B2 10/2012 Fischer
9,641,941 B2 5/2017 Fischer
(Continued)

FOREIGN PATENT DOCUMENTS

DE 102006013345 B4 4/2009
EP 2389014 A1 * 11/2011 ........... H04R 23/008
EP 2710335 B8 9/2016

OTHER PUBLICATIONS

Unified Approach to Ultrasonic Light Diffraction by Klein et al (Year: 1967).*
(Continued)

*Primary Examiner* — Tarifur R Chowdhury
*Assistant Examiner* — Kaitlyn E Kidwell
(74) *Attorney, Agent, or Firm* — Office of Chief Counsel for National Institute of Standards and Technology

(57) ABSTRACT

A sound pressure metrology instrument determines sound pressure from index of refraction and includes: a light source that produces source light; the optical cavity that: receives an acoustic field from the sound source; receives the source light from the light source; produces acoustic-modified light from the source light; and communicates the acoustic-modified light to the photodetector; the photodetector that receives the acoustic-modified light from the optical cavity, produces an acoustic-modified signal from the acoustic-modified light, and communicates the acoustic-modified signal to the analyzer module; the analyzer module in electrical communication with the photodetector and that receives the acoustic-modified signal from the photodetector
(Continued)

and determines the sound pressure of the acoustic field produced by the sound source from the modulations in the index of refraction of the acoustic medium inside the optical cavity encoded in the acoustic-modified light.

16 Claims, 15 Drawing Sheets

(56) References Cited

U.S. PATENT DOCUMENTS

| | | | | |
|---|---|---|---|---|
| 9,719,878 | B2 | 8/2017 | Hendricks et al. | |
| 10,547,953 | B2 | 1/2020 | Wingate et al. | |
| 11,175,224 | B2 | 11/2021 | Douglass et al. | |
| 2006/0290944 | A1* | 12/2006 | Arnott | G01N 21/1702 356/519 |
| 2009/0257753 | A1* | 10/2009 | Fischer | H04R 23/008 398/133 |
| 2012/0272718 | A1* | 11/2012 | Rezachek | G01N 21/1702 73/24.02 |
| 2014/0360273 | A1* | 12/2014 | Zhang | G01N 21/1702 73/643 |
| 2016/0018280 | A1* | 1/2016 | Hendricks | G01N 21/45 73/705 |

OTHER PUBLICATIONS

On the limitations of optical characterization of intense ultrasound fields in the Raman-Nath regime (Year: 2014).*

Gradient analysis of Sound Pressure Field by Opt-acoustic Wave-Frontal Detection by Teramoto et al. (Year: 2007).*

Rezki, A., et al., "Low-frequency acoustic pressure measurements based on a Fabry-Perot Refractometer", IMEKO 24th TC3, 14th TC5, 6th TC16 and 5th TC22 International Conference, 2022, p. 1-6.

Preisser, S., et al., "All-optical highly sensitive akinetic sensor for ultrasound detection and photoacoustic imaging", Biomedical Optics Express, 2016, p. 4171-4186, vol. 7 No. 10.

Preißer, Stefan, et al., "Listening to Ultrasound with a Laser", Optik&Photonik, 2017, p. 22-25.

Fan, H., et al., "Ultrasound sensing based on an in-fiber dual-cavity Fabry-Perot interferometer", Optics Letters, 2019, p. 3606-3909, vol. 44 No. 15.

Chen, J., et al., "Micro-fiber-optic acoustic sensor based on high-Q resonance effect using Fabry-Pérot etalon", Optics Express, 2021, p. 16447-16454, vol. 29, No. 11.

Egan, P.F., et al., "Performance of a dual Fabry-Perot cavity refractometer", Optics Letters, 2015, p. 3945-3948, vol. 40, No. 17.

Egan, P.F., et al., "Comparison measurements of low-pressure between a laser refractometer and ultrasonic manometer", Review of Scientific Instruments, 2016, p. 053113, vol. 87.

Nakamura, K., et al., "Measurements of Air-Borne Ultrasound by Detecting the Modulation in Optical Refractive Index of Air", IEEE Ultrasonics Symposium, 2002, p. 609-612, vol. 1.

Torras-Rosell, A., et al., "Sound field reconstruction using acousto-optic tomographya", 2012, p. 3786-3793, J. Acoust. Soc. Am., vol. 131.

Chijioke, A., et al., "Optical Cavity Acoustic Pressure Standard", Conference on Light and Electro-optics (CLEO), 2022, p. 1-2.

Chijioke, A., et al., "Optical-cavity-based primary sound standard", 28th International Congress on Sound and Vibration 2022 (ICSV28), 2022, p. 1-8.

Chijioke, A., et al.,"Optical-cavity-based primary sound standard," conference abstract submitted to 2023 CCM & IMEKO International Conference on Pressure and Vacuum Metrology, 2023, p. 1-3.

Chijioke, A., et al., "Optical-cavity-based primary sound standard," poster presented at 2023 CCM & IMEKO International Conference on Pressure and Vacuum Metrology, 2023, p. 1.

Chijioke, A., et al., "Primary Sound Standard based on Dynamic Fabry-Perot Refractometry", Proceedings of the 2023 CCM & IMEKO International Conference on Pressure and Vacuum Metrology, 2023, p. 1-7.

Fischer, B., "Optical microphone hears ultrasound", Nature Photonics, 2016, p. 356-358, vol. 10.

* cited by examiner

Fixed-length acoustic resonator: supports standing acoustic waves at acoustic wavelengths $\lambda_{ac} = L/N$ where $N$ is an integer.

Acoustic coupler: Uniform acoustic field with $L << \lambda_{ac}$

SOUND PRESSURE METROLOGY INSTRUMENT AND DETERMINING SOUND PRESSURE FROM INDEX OF REFRACTION

CROSS REFERENCE TO RELATED APPLICATIONS

This application claims the benefit of U.S. Provisional Patent Application Ser. No. 63/401,735 (filed Aug. 29, 2022), which is herein incorporated by reference in its entirety.

STATEMENT REGARDING FEDERALLY SPONSORED RESEARCH

This invention was made with United States Government support from the National Institute of Standards and Technology (NIST), an agency of the United States Department of Commerce. The Government has certain rights in this invention.

BRIEF DESCRIPTION

Disclosed is a sound pressure metrology instrument for determining sound pressure from index of refraction, the sound pressure metrology instrument comprising: a light source that produces source light and communicates the source light to an optical cavity; the optical cavity disposed in an acoustic medium and in optical communication with the light source, in acoustic communication with a sound source, and in optical communication a photodetector and that: receives an acoustic field from the sound source; receives the source light from the light source; produces acoustic-modified light from the source light in response to the source light interacting with the acoustic field in the optical cavity, such that the acoustic-modified light encodes modulations in the index of refraction of the acoustic medium inside the optical cavity due to the acoustic field; and optically communicates the acoustic-modified light to the photodetector; the photodetector in optical communication with the optical cavity and in electrical communication with an analyzer module and that receives the acoustic-modified light from the optical cavity, produces an acoustic-modified signal from the acoustic-modified light, and communicates the acoustic-modified signal to the analyzer module; the analyzer module in electrical communication with the photodetector and that receives the acoustic-modified signal from the photodetector and determines the sound pressure of the acoustic field produced by the sound source from the modulations in the index of refraction of the acoustic medium inside the optical cavity encoded in the acoustic-modified light.

Disclosed is a process for determining sound pressure from index of refraction, the process comprising: receiving, by an optical cavity disposed in an acoustic medium, an acoustic field from a sound source; receiving, by the optical cavity, source light from a light source; interacting source light with the acoustic field in the optical cavity; producing an acoustic-modified light from the source light in response to interacting with the acoustic field, such that the acoustic-modified light encodes modulations in the index of refraction of the acoustic medium inside the optical cavity due to the acoustic field; communicating the acoustic-modified light signal to a photodetector; receiving the acoustic-modified light by the photodetector; producing, by the photodetector, an acoustic-modified signal from the acoustic-modified light; communicating the acoustic-modified signal from the photodetector to an analyzer module; and determining, by the analyzer module, the sound pressure of the acoustic field from the modulations in the index of refraction of the acoustic medium encoded inside the optical cavity in the acoustic-modified light.

BRIEF DESCRIPTION OF THE DRAWINGS

The following description cannot be considered limiting in any way. Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
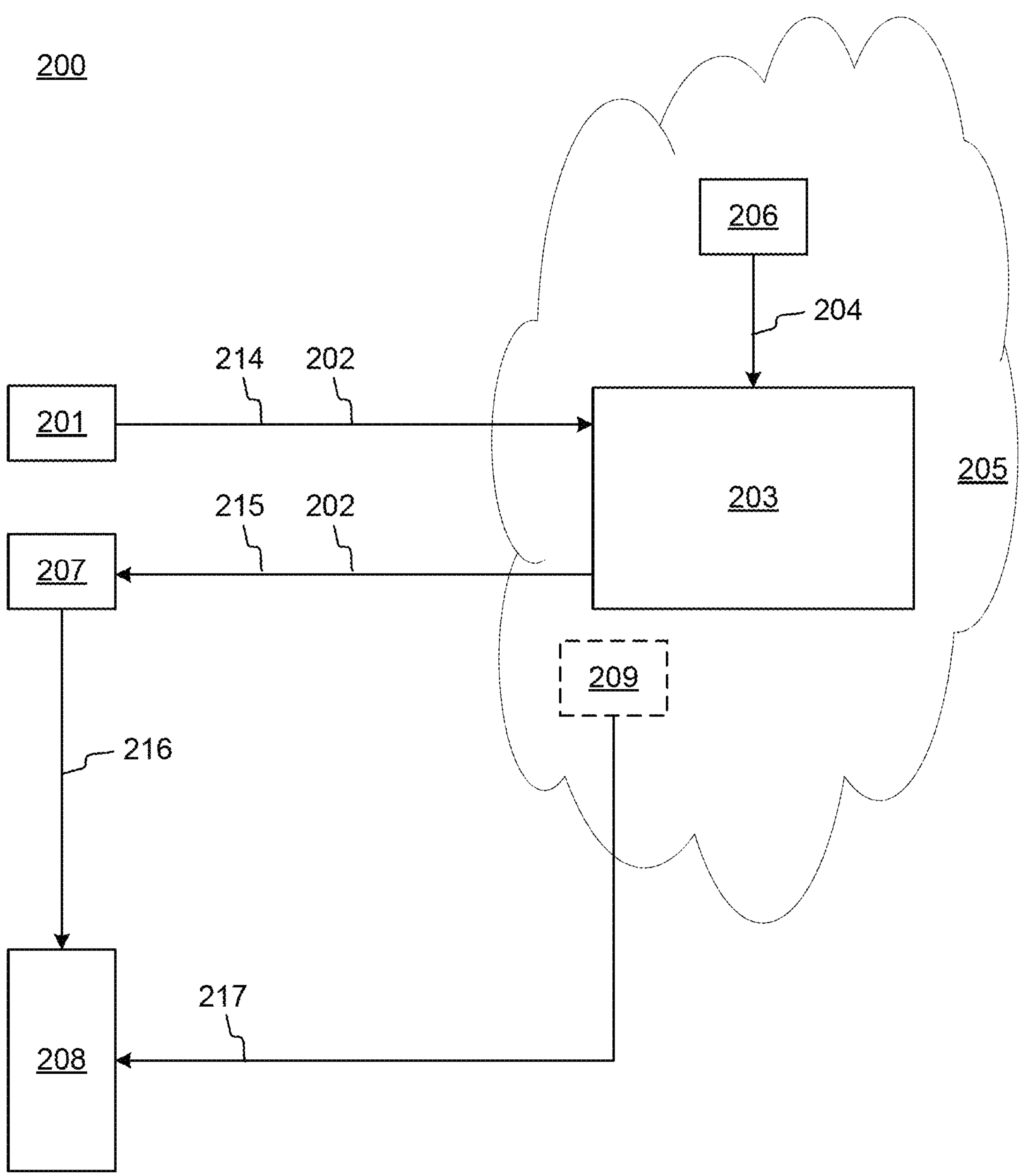
FIG. 1 shows, according to some embodiments, a sound pressure metrology instrument.

A detailed description of one or more embodiments is presented herein by way of exemplification and not limitation.

The are several conventional methods for performing primary sound pressure measurements, primary meaning that the sound pressure is not determined by already having a calibrated sound pressure measuring or generating instrument to use as a reference. A conventional method is the reciprocity method that relies on the properties of linear reversible transducers to calibrate their linear sensitivities without prior knowledge of the acoustic field characteristics such as the sound pressure.

As described herein, sound pressure metrology instrument 200 and determining sound pressure from index of refraction overcome certain deficiencies of measurements based on primary references calibrated using the reciprocity method. Sound pressure metrology instrument 200 measures the sound pressure directly and does not require the use of reciprocal transducers to achieve a primary sound calibration or measurement. Further, sound pressure metrology instrument 200 can provide increased accuracy and primary calibration over a wider range of sound frequencies compared to conventional methods. Sound pressure metrology instrument 200 measures sound pressure that is superior to conventional methods in that sound pressure metrology instrument 200 directly realizes the sound pressure and is applicable to direct primary sound measurements and to calibration of a wide variety of sound sources and sensors, can be more accurate than conventional methods, and can be applicable to a wider range of sound frequencies than conventional methods while providing traceability of sound pressure to quantum standards.

It has been discovered that sound pressure metrology instrument 200 can include a high-finesse optical cavity and measures sound-driven refractive index oscillation in a gas or fluid and determines sound pressure from a dependence of the refractive index on pressure. Advantageously, determining sound pressure from index of refraction with sound pressure metrology instrument 200 can be implemented in a closed volume structure such as an acoustic resonator or coupler or implemented in an open environment. Beneficially, determining sound pressure level from index of refraction with sound pressure metrology instrument 200 provides SI-traceable measurement of acoustic pressure and allows calibration of acoustic instruments (microphones, sound level meters, pistonphones, loudspeakers, and the like), wherein SI refers to International System of Units. The acoustic pressure can be quantum traceable by first principles calculations of refractive index of the medium, or by measurements that determine the refractive index of the medium in terms of those of another medium (e.g., helium) for which high-accuracy first principles calculations are available.

It should be appreciated that traceability is the ability to relate a measurement result to a reference through an unbroken chain of calibrations, each of which contributes to the measurement uncertainty. Measurement uncertainty is a quantitative expression of the degree of doubt that exists about the correctness of a measurement result. Traceability allows one to compare measurements made in different laboratories or at different times and to ensure that they are consistent with each other. Traceability ensures the accuracy of measurements as it allows quantification of the uncertainty associated with a measurement result.

Relatedly, SI traceability is the ability to relate a measurement result to the SI units through an unbroken chain of calibrations. The SI units are the International System of Units, and they are the most widely used system of units in the world. SI traceability is important for ensuring that measurements are made in a consistent and accurate manner. There are a number of ways to achieve SI traceability. One way is to use a calibrated instrument that has been calibrated in a manner traceable to the SI units. Another way is to use a primary measurement method that determines the measurement result by combining contributing observations and measurements according to accurately known relationships, with any significant such contributing measurements having been themselves made in a manner traceable to their SI units.

Sound pressure metrology instrument 200 determines sound pressure from index of refraction. As used herein, sound pressure refers to a complex quantity, composed of both an amplitude and a phase. The phase is defined with respect to a reference quantity or signal, the choice of which is arbitrary. In some cases, only the amplitude of the sound pressure can be determined. In some cases, only the phase of the sound pressure can be determined. In some cases, the sound pressure can be a spectral content or another alternative representation, which can include a part of the information represented by the complex sound pressure. In an embodiment, with reference to FIG. 1, FIG. 2, FIG. 3, FIG. 4, FIG. 5, FIG. 6, FIG. 8, FIG. 9, FIG. 10, FIG. 11, and FIG. 12, sound pressure metrology instrument 200 for determining sound pressure from index of refraction includes: light source 201 that produces source light 214 and communicates source light 214 to optical cavity 203; optical cavity 203 disposed with acoustic medium 205, such that part or all of acoustic medium 205 is within the optical mode volume of optical cavity 203, and in optical communication with light source 201, in acoustic communication with sound source 206, and in optical communication photodetector 207 and that: receives acoustic field 204 from sound source 206; receives source light 214 from light source 201; produces acoustic-modified light 215 from source light 214 in response to source light 214 interacting with acoustic field 204 in optical cavity 203, such that acoustic-modified light 215 encodes modulations in the index of refraction of acoustic medium 205 inside optical cavity 203 due to acoustic field 204; and optically communicates acoustic-modified light 215 to photodetector 207; photodetector 207 in optical communication with optical cavity 203 and in electrical communication with analyzer module 208 and that receives acoustic-modified light 215 from optical cavity 203, produces acoustic-modified signal 216 from acoustic-modified light 215, and communicates acoustic-modified signal 216 to analyzer module 208; analyzer module 208 in electrical communication with photodetector 207 and that receives acoustic-modified signal 216 from photodetector 207 and determines by primary means based on the refractive index dependence on sound pressure the acoustic pressure of acoustic field 204 from modulations in the index of refraction of acoustic medium 205 inside the optical mode volume of optical cavity 203 encoded in acoustic-modified light 215. It is contemplated that the acoustic medium 205 can be partially or wholly disposed in optical cavity 203.

In an embodiment, sound pressure metrology instrument 200 includes supplemental sensor 209 in communication with analyzer module 208, produces supplemental sensor signal 217, and communicates supplemental sensor signal 217 to analyzer module 208. In an embodiment, supplemental sensor 209 includes a temperature sensor, humidity sensor, pressure sensor, mass spectrometer, chromatograph, or wave meter that measures a temperature, humidity, static background pressure, or composition of acoustic medium 205 in optical cavity 203 or optical frequency or wavelength of source light 214 or acoustic-modified light 215. In an embodiment, supplemental sensor 209: measures a temperature, humidity, static background pressure, or composition of acoustic medium 205 in optical cavity 203 or optical frequency or wavelength of source light 214 or acoustic-modified light 215, and communicates temperature, humidity, static background pressure, or composition of acoustic medium 205 in optical cavity 203 or optical frequency or wavelength of source light 214 or acoustic-modified light 215 as supplemental sensor signal 217 to analyzer module 208. In an embodiment, analyzer module 208 receives supplemental sensor signal 217 from supplemental sensor 209, and analyzer module 208 uses supplemental sensor signal 217 to improve the fidelity of the determination of the sound pressure.

In an embodiment, analyzer module 208 determines sound pressure from the index of refraction based on $$\Delta p = \Delta n\left(\frac{dn}{dp}\right)_X^{-1}$$

wherein X is a condition on the derivative and is adiabatic, isothermal, or polytropic; n is index of refraction of acoustic medium 205; and p is sound pressure.

In an embodiment, sound pressure metrology instrument 200 includes sound source 206.

In an embodiment, sound pressure metrology instrument 200 includes acoustic enclosure 210 in which is disposed optical cavity 203, acoustic medium 205, sound source 206, and acoustic field 204. In an embodiment the optical cavity 203 shares common boundaries with acoustic enclosure 210, these common boundaries forming a part or whole of the boundaries of optical cavity 203 or acoustic enclosure 210. In an embodiment, optical cavity 203 is external to acoustic enclosure 210, and a part or whole of acoustic enclosure 210 is disposed in optical cavity 203. In an embodiment, acoustic enclosure 210 is an acoustic resonator, wherein acoustic enclosure 210 supports a standing acoustic wave at an acoustic wavelength $\lambda_{ac}$=L/N, wherein N is an integer, and L is a distance of separation of sound source 206 and microphone 212 that are disposed in acoustic enclosure 210 disposed on its walls. In an embodiment, acoustic enclosure 210 is an acoustic coupler with dimensions that are smaller than the acoustic wavelength, wherein acoustic field 204 has an approximately constant acoustic pressure in acoustic enclosure 210.

In an embodiment, sound pressure metrology instrument 200 incudes sound source driver 211 in electrical communication with sound source 206 and that provides driver signal 218, communicates driver signal 218 to sound source 206, and controls production of acoustic field 204 by sound source 206 with driver signal 218.

In an embodiment, sound pressure metrology instrument 200 includes microphone 212 in acoustic communication with sound source 206 such that optical cavity 203 is acoustically interposed between sound source 206 and microphone 212, such that microphone 212 receives acoustic field 204 that propagates through optical cavity 203 from sound source 206, produces microphone signal 219 from acoustic field 204, and communicates microphone signal 219 to microphone receiver 213. In an embodiment, sound pressure level metrology instrument 200 includes microphone receiver 213 in electrical communication with microphone 212 and receives microphone signal 219 from microphone 212, produces acoustic signal 221 from microphone signal 219, and communicates the acoustic signal 221 to analyzer module 208, such that the sound pressure level measured by analyzer module 208 is compared with microphone signal 219 from microphone 212 to calibrate the sensitivity of microphone 212. The microphone sensitivity can be a complex quantity, having an amplitude and a phase. The phase is defined with respect to a reference quantity or signal, often the acoustic pressure at a specified location, although other choices of phase reference are possible. In some cases, only the amplitude of the sensitivity may be determined. In some cases, only the phase of the sensitivity may be determined. In some cases, the obtained sensitivity may be a spectral content or another alternative representation, which may contain only a part of the information represented by the complex sensitivity.

In an embodiment, sound pressure metrology instrument 200 includes microphone 212 in acoustic communication with sound source 206 with optical cavity 203, sound source 206, and microphone 212 with relative locations and orientations such that the optical cavity is not acoustically interposed between sound source 206 and microphone 212. The sound pressure metrology instrument 200 determines the sound pressure at the location of optical cavity 203 and from this determines sound pressure at the location of microphone 212, which can be the same as or different than the sound pressure at the location of optical cavity 203.

In an embodiment, sound pressure metrology instrument 200 measures the sound pressure in a fluid medium, e.g., a gas, by using an optical cavity to observe the change in the medium's refractive index due to the sound pressure. A light source (e.g. a laser, multiple lasers, or an optical frequency comb) generates coherent optical light. The light travels to an optical cavity via an optical path. The optical path can be wholly or partially in vacuum, air or other fluid, or in fiber or other solid state waveguiding structure, and the light may traverse multiple optical and electro optical elements that modify its characteristics as it travels along the optical path. The acoustic field modulates the index of refraction of the medium probed by the light in the optical cavity, which in turn changes the cavity's optical path length and measurable properties of the optical cavity 203 such as resonant frequency, reflected phase, round trip phase, transmitted power of light of a specified frequency, reflected power of light of a specified frequency, and the like. A portion of the light beam that is either reflected or transmitted by the cavity is detected by a photodetector. This signal then goes through data processing steps in analyzer module 208 to determine the measured sound pressure. Accordingly, sound pressure metrology instrument 200 provides a low-uncertainty measurement of the sound pressure, which can be used to calibrate microphones or sound sources. In addition, sound pressure metrology instrument 200 could be used as an intrinsically traceable microphone.

In an embodiment, with reference to FIG. 1, sound pressure metrology instrument 200 accurately measuring the sound pressure without an external calibration by detecting modulations in the index of refraction of acoustic medium 205 inside optical cavity 203 and using relationships between sound pressure and index of refraction. Here, an acoustic signal generated by a source and propagates in an acoustic medium. The sound source may be a speaker that is a component of the apparatus, or it may be external to the apparatus (e.g., ambient sound). The acoustic medium could be a gas, such as air, or a liquid and is present inside and outside of the optical cavity. To measure the sound at the location of the optical cavity, light is emitted from a light source (e.g., a laser or optical frequency comb) and is communicated along an optical path to the optical cavity. The optical path can be free space or an optical fiber and can include optical elements (e.g., waveplates, beam splitters, mirrors, lenses, modulators, and the like) to manipulate the polarization, direction, shape, or phase of the optical beam. The optical cavity is a narrowband optical frequency filter with optical resonances at frequencies that depend upon the physical length of the cavity and the index of refraction of the acoustic medium inside the cavity. These optical resonances oscillate at the acoustic frequency or frequencies at an amplitude proportional to the sound pressure due to modulations of the acoustic medium's index of refraction. After interacting with the optical cavity, the light communicates along another optical path and is detected by a photodetector. The electronic signal from the photodetector is sent to an analyzer, wherein the signal is analyzed to determine the frequency and amplitude at which a resonance of the optical cavity is moving, the corresponding changes to the index of refraction of the acoustic medium inside the cavity using a known relationship between the change in the optical cavity resonances and the index of refraction, and the corresponding sound pressure using a known relationship between the pressure of the acoustic medium and the index of refraction. Optionally, additional sensors can also supply other inputs to the analyzer to improve the fidelity of the calculation. Some examples include measurements of the optical frequency or wavelength, acoustic medium composition, acoustic medium temperature, relative humidity, and static pressure.

Figure 2:
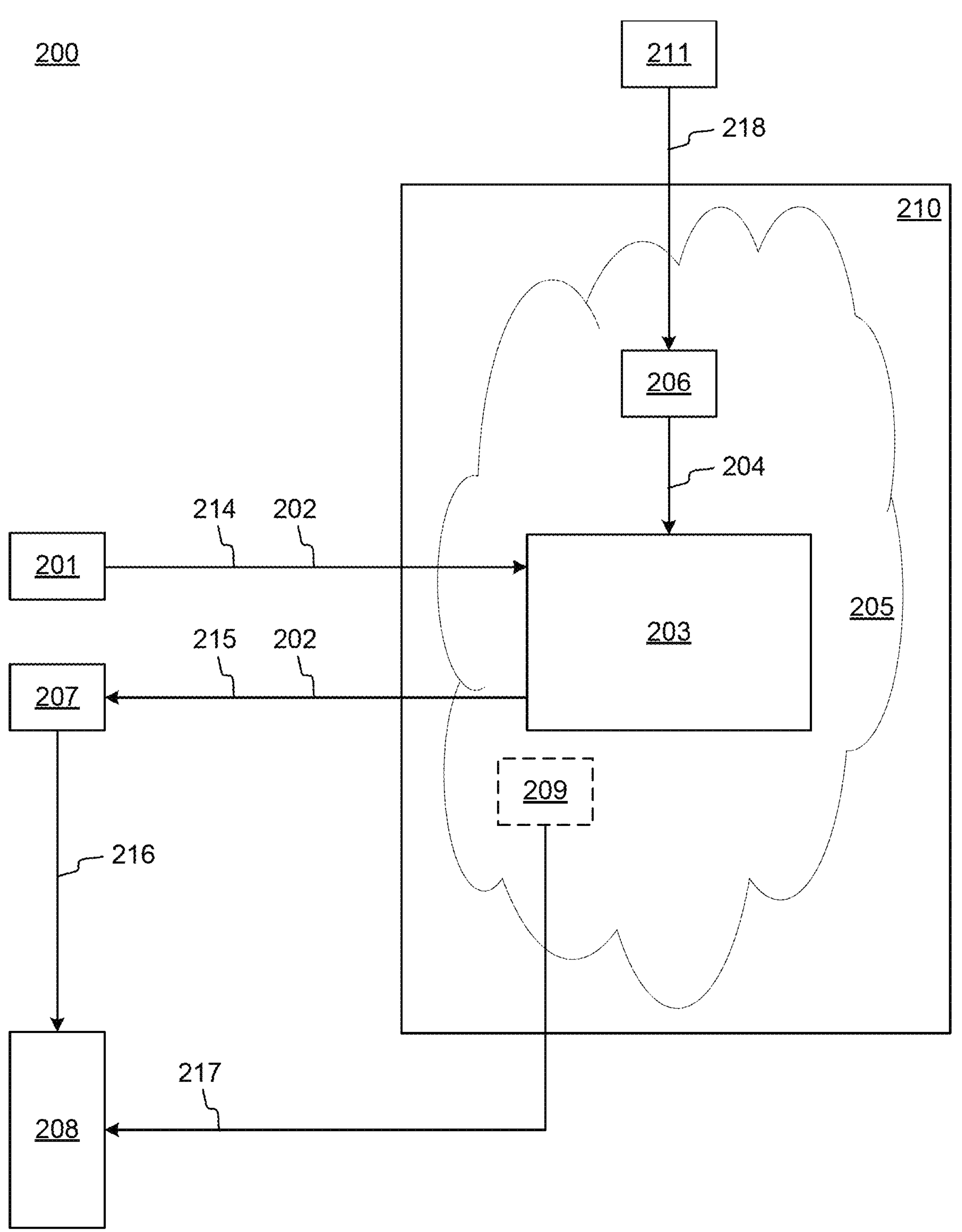
FIG. 2 shows, according to some embodiments, a sound pressure metrology instrument.

In an embodiment, with reference to FIG. 2, sound pressure metrology instrument 200 calibrates the sensitivity of a sound source. Here, the optical cavity 203, acoustic medium 205, sound source 206, and acoustic field 204 can be disposed in an optional acoustic enclosure 210. A sound source driver 211 sends an electrical signal 218 to the sound source 206 to control the acoustic field. The sound pressure determined by the analyzer 208 can be compared with the drive signal from to calibrate the sensitivity (e.g. Pa/V, Pa/A, $m^3$/s/V, and the like) of the sound source. The sound pressure can be compared to a setting or input to the sound source driver 211 to calibrate the sensitivity (e.g. Pa per input setting, $m^3$/s per input setting, and the like) of the combination of the sound source driver 211 and sound source 206. It is noted that sound source sensitivity (and likewise sensitivity of the combination of sound source and sound source driver) is in general a complex quantity, composed of both an amplitude and a phase. The phase is defined with respect to a reference quantity or signal, often the acoustic pressure at a specified location, although other choices of phase reference are possible. In some cases only the amplitude of the sensitivity may be determined. In some cases only the phase of the sensitivity may be determined. In some cases the obtained sensitivity may be in the form of a spectral content or another alternative representation, which may contain only a part of the information represented by the complex sensitivity.

Figure 3:
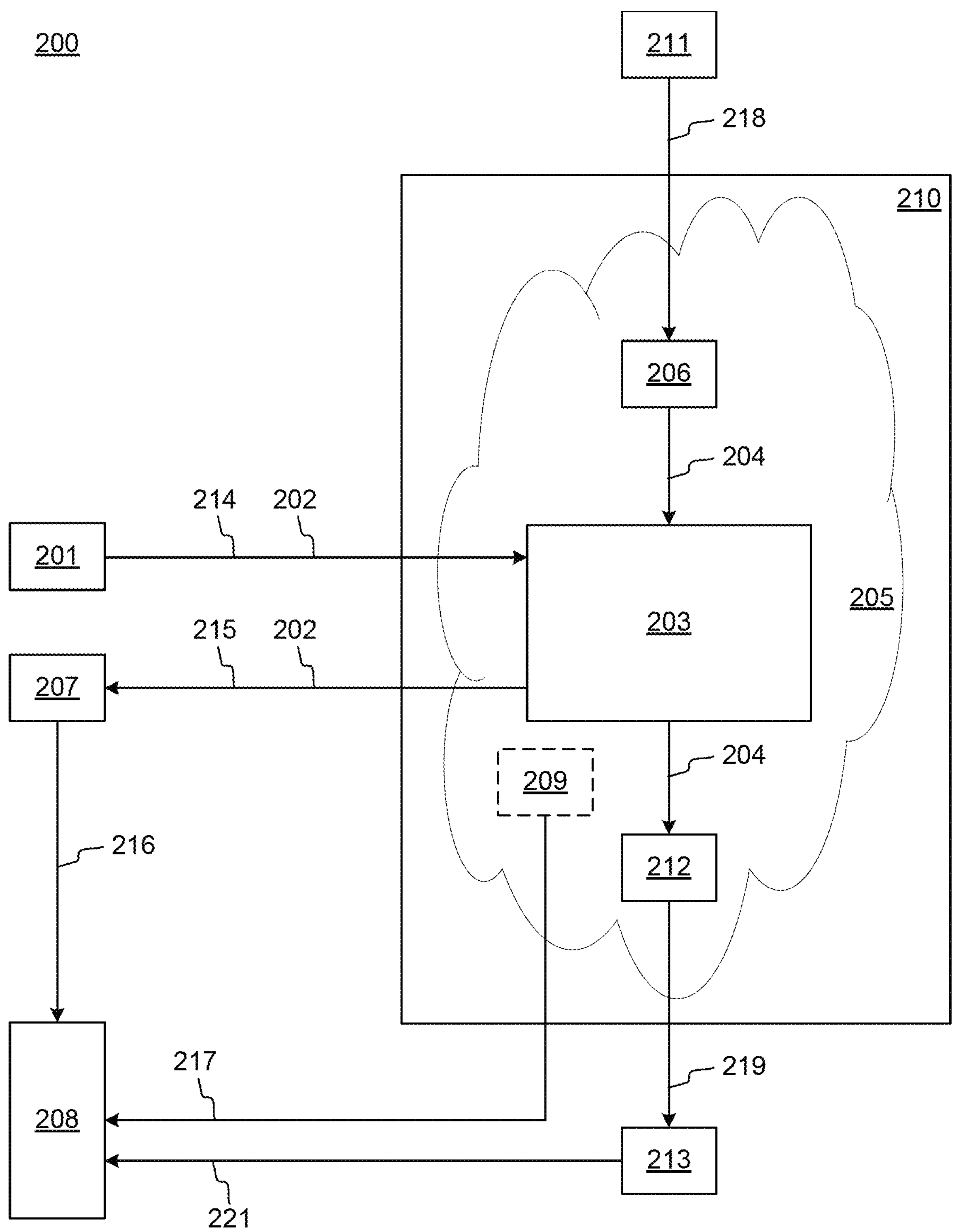
FIG. 3 shows, according to some embodiments, a sound pressure metrology instrument.

In an embodiment, with reference to FIG. 3, sound pressure metrology instrument 200 calibrates the sensitivity of a microphone. Here, the optical cavity 203, acoustic medium 205, sound source 206, acoustic field 204, and microphone 212 can be disposed in an acoustic enclosure 210. Alternatively there may be no acoustic enclosure. A sound source driver 211 sends and electrical signal to the sound source to control the acoustic field. The geometry of the acoustic enclosure can ensure that the sound pressure at the location of the optical cavity 203 has a known relationship to the sound pressure and other acoustic properties at the location of the microphone 212. The microphone response is measured by a microphone receiver 213. The sound pressure measured by the analyzer 208 is compared with the microphone response to calibrate the sensitivity (e.g., V/Pa) of the microphone 212.

Sound pressure metrology instrument 200 can be made of various elements and components that can be assembled together or fabricated. Elements of sound pressure metrology instrument 200 can be various sizes and shapes. A size and shape of optical cavity 203, and acoustic enclosure 210 for embodiments including such an enclosure, are selected to support optical interrogation and sampling of acoustic field 204.

Elements of sound pressure metrology instrument 200 can be made of a material that is physically or chemically resilient in an environment in which sound pressure level metrology instrument 200 is disposed. Exemplary materials include a metal, ceramic, thermoplastic, glass, semiconductor, and the like. The elements of sound pressure metrology instrument 200 can be made of the same or different material and can individually be monolithic as single physical bodies or can be composed of separate members that are phsiycially joined or separated.

Sound pressure metrology instrument 200 can include elements that measure sound by measuring an amplitude variation of optical refractive index of acoustic medium 205 in the region of acoustic field 204 and analyzing, e.g., calculating such, from the amplitude of the pressure, temperature, or density oscillation.

The light source 201 is a device that emits light. It can be a laser, an optical frequency comb, an LED, or another type of light source. The light source 201 emits light at one or more wavelengths that are resonant with a resonant frequency of optical modes of optical cavity 203. The light source 201 emits light at a high enough power level to produce a measurable amount of acoustic-modified light 215 as detected by photodetector 207. The light source 201 can output light at a wide range of wavelengths. The specific wavelengths that the light source 201 emits can depend on the type of light source that is used. The light source 201 can also output light at a wide range of power levels. The specific power level that the light source 201 emits can depend on the application.

The light source 201 can be operated at a specific wavelength and power level to produce a measurable signal from photodetector 207. The wavelength of emission and power level of the light source 201 can optionally be adjustable using the controls on the sound pressure metrology instrument 200.

There are many different types of light sources that can be used in the sound pressure metrology instrument 200 and can include lasers, LEDs, optical frequency combs, incandescent bulbs, and the like. Different types of light source may have relative advantages and disadvantages.

To operate the light source 201, connect it to the sound pressure metrology instrument 200 and turn on the power to the sound pressure metrology instrument 200. The light source 201 can be automated to automatically turn on and begin emitting light. To adjust the wavelength and power level of the light source 201, controls on the sound pressure metrology instrument 200 can be used. For example, the wavelength of the light source 201 can be adjusted by turning a wavelength knob. The power level of the light source 201 can be adjusted by turning a power knob. Alternatively, operating parameters can be adjusted using digital control.

With the light source 201 is operating, optional sound source 206 can be disposed in its selected location and operated to produce an acoustic field 204 that interacts with source light 214. Alternatively the sound source 206 can be operated to produce the acoustic field prior to turning on the light source or simultaneously with turning on the light source. The interaction of the light with the acoustic medium 205 that is modified by the acoustic field 204 causes conversion from source light 214 to acoustic-modified light 215, and the change in optical properties between source light 214 and acoustic-modified light 215 encodes the sound pressure of the acoustic field. That is, the sound pressure of the acoustic field can be determined by measuring the optical properties of acoustic-modified light 215. This can be done using photodetector 207 such as a photodiode, spectrometer, power meter, and the like. The sound pressure of the acoustic field can be displayed on a display of the sound pressure metrology instrument 200.

The light source 201 can be any type of light source that produces light in from the ultraviolet to the far-infrared parts of the spectrum. The source light 214 is selected to have one or more wavelengths that are resonant or nearly resonant inside the optical cavity 203. The light source 201 can be operated at a constant output power. The average output power of the light source 201 can be from 1 nW to 1 MW. The light source can be of a pulsed nature.

The light source 201 can be secured to the optical cavity 203. The light source 201 can be connected to the optical cavity 203 by an optical fiber. The light source 201 can be operated by a microcontroller. The microcontroller can control operation of the other components of the sound pressure metrology instrument 200.

The source light 214 can have a number of selectable properties. It can be coherent such that the waves of light can be in phase with each other. This can produce a focused beam of light. It can be monochromatic to resonantly interact with optical cavity 203 or acoustic field 204. It can have a variable power output to produce a strong enough signal as acoustic-modified light 215 to be detected by the photodetector 207. Source light 214 that can include light with wavelengths from 100 nm to 100,000 nm. Operation with a laser wavelength near 1550 nm can provide integration with a large number of fiber optic components designed for telecommunications, making sound pressure metrology instrument 200 scalable and compatible with off-the-shelf optical characterization tools.

Acoustic-modified light 215 is a product of source light 214 modified by interaction with acoustic field 204. This is a result of passing source light 214 through acoustic medium 205 that is subjected to acoustic field 204. The result is that acoustic-modified light 215 can encode modulations due to acoustic field 204 and can have a different frequency, wavelength, phase, power, spatial distribution, polarization or the like, than source light 214 did before source light 214 modified by acoustic field 204. The range of outputs of acoustic-modified light 215 depends on the strength of acoustic field 204 and the properties of acoustic medium 205 through which source light 214 is passing. In general, the stronger the acoustic field, the greater the change in the light's properties. There can be different types of acoustic-modified light. Linear acoustic-modified light has been modified in a linear fashion by the acoustic field. This means that the change in the light's properties is directly proportional to the strength of the acoustic field. Nonlinear acoustic-modified light is modified in a nonlinear fashion by the acoustic field. This means that the change in the light's properties is not directly proportional to the strength of the acoustic field.

The optical path 202 of the sound pressure metrology instrument 200 is a region of space within which light travels. It can be defined by the surfaces of the optical components that make up the path, such as lenses, mirrors, and prisms. The optical path may also be defined by the presence of a medium, such as air or water or other fluid, through which the light travels. The optical path may be partially or entirely in a solid medium such as an optical fiber or in other solid-state waveguiding structures. Solid-state waveguiding structures defining the optical path or portions thereof may be of a microfabricated nature, and such microfabricated structures may include the light source 201. The optical path may be partially or entirely in vacuum. The physical properties of optical path 202 for sound pressure level metrology include length, refractive index, dispersion, imparted phase shift, imparted frequency shift, imparted polarization change, and the like. The optical path 202 of the sound pressure metrology instrument 200 can produce a wide range of outputs, depending on the design of the instrument.

The optical path 202 of the sound pressure metrology instrument 200 can be assembled and can involve aligning the optical components and ensuring that they are properly connected to the instrument. The optical path or components thereof can be made by a variety of methods, including machining, molding, drawing, microfabrication, and casting. The choice of manufacturing method depends on the nature of the optical path and components thereof.

The optional sound source 206 of the sound pressure metrology instrument 200 produces acoustic field 204. The acoustic field 204 is a disturbance in the pressure of a medium, such as air, that propagates through the medium as a wave. The acoustic field may be produced by a sound source 206 or may be the acoustic field resulting from unidentified origins in the environment of the acoustic metrology instrument 200 or within the acoustic metrology instrument 200. The optional sound source 206 can be any device that generates acoustic field 204, such as a loudspeaker, a siren, or tuning fork, mechanical vibration, voice, and the like. The sound source 206 can be characterized by its frequency range, its output level, and its directivity. The frequency range is the range of frequencies that the sound source 206 can generate. The output level is the maximum sound pressure that the sound source 206 can produce. The directivity is the way in which the sound energy is distributed in space.

The optional sound source 206 can be operated by applying an electrical signal to it, e.g., driver signal 218 from sound source driver 211. The electrical signal may control the amplitude or frequencies of the acoustic field 204 that the sound source 206 generates.

The optional sound source 206 can be made from a variety of materials, including metals, plastics, glasses, and ceramics. The materials used for the sound source 206 can affect its frequency range, output level, and directivity. The sound source 206 can be made by assembling the various components into a housing. The housing can be made from a variety of materials, such as metal, plastic, or wood. The housing can protect the sound source 206 from the elements and can help to direct the sound energy in a desired direction. In some instances, sound source 206 is an unknown source that produces acoustic field 204 or a manufactured product subject to calibration.

The sound source 206 may be a constituted of several different devices that can create sound, which may be similar or different to each other, and which may each produce sound that has similar or different characteristics as described by properties such as frequency, sound pressure, intensity, directivity, etc. Some of the devices constituting sound source 206 may be unknown.

Physical properties of sound source 206 can determine its performance. The frequency range, e.g., as expressed in Hertz (Hz) is the range of frequencies that the sound source 206 can generate. The output level is the maximum sound pressure that the sound source 206 can produce, in a defined spatial location and surrounding environment, for example averaged over the optical cavity 203 in the acoustic environment within acoustic enclosure 210. The output level can be expressed in decibels (dB). The directivity is the way in which the sound energy is distributed in space. The directivity can be shown in a polar plot. The sound source 206 can generate a wide range of outputs, from below zero decibels to greater than 140 decibels. The output level of the sound source 206 can be controlled by the electrical signal that is applied to it. The electrical signal controls the amplitude and frequencies of the acoustic field 204 that the sound source 206 generates. The operating parameters of the sound source 206 ensure that it is operating correctly, including the voltage of the electrical signal that is applied to the sound source 206, current that flows through the sound source 206, or power that is dissipated by the sound source 206.

The sound source 206 can produce a wide range of acoustic frequencies and output levels. The frequency range of sound source 206 can be from 0.001 Hz to 10 GHz. The output level range of sound source 206 can be from −20 dB to 200 dB.

There are a variety of types of sound sources that can be used in the sound pressure metrology instrument 200. Piezoelectric transducers convert electrical signals into sound waves and can generate a wide range of frequencies. Loudspeakers are electroacoustic transducers that convert electrical signals into sound waves and can generate a wide range of frequencies. Sirens are mechanical devices that generate sound waves by rotating a blade or disc and can generate a high-pitched tone. Tuning forks are mechanical devices that generate sound waves by vibrating a metal prong and can generate a pure tone.

The sound source 206 can be made from a variety of materials, including metals, plastics, and ceramics. The materials used for the sound source 206 can affect its frequency range, output level, and directivity.

The acoustic field 204 is the pattern of acoustic energy propagation, in the form of time-varying density, pressure, temperature, etc. at various spatial locations in the acoustic medium 205, that is generated by the sound source 206. The acoustic field 204 interacts with source light 214 in optical cavity 203 and causes the index of refraction of the acoustic medium 205 to vary. This variation in the index of refraction is encoded in the acoustic-modified light 215, which is then detected by the photodetector 207. The analyzer module 208 then determines the sound pressure of the acoustic field 204 from the modulations in the index of refraction of the acoustic medium 205 encoded in the acoustic-modified light 215.

The acoustic field 204 has a number of physical properties that are important for its operation in the sound pressure metrology instrument 200. The acoustic field is made up of sound waves with a range of frequencies, and this range can be narrow such that the acoustic field 204 is described as having a single frequency. The frequency of a sound wave is the number of cycles per second that the wave repeats and determines the wavelength of the wave, the distance between two successive peaks or troughs of the wave. The wavelength of a sound wave is the distance between two successive peaks or troughs of the wave. The acoustic field is made up of sound waves with a range of wavelengths, and this range can be narrow such that the acoustic field 204 is described as having a single wavelength. The pressure amplitude of the change in the pressure of the medium from its mean value. The density amplitude of the acoustic field 204 is the maximum change in the density of the medium from its mean value. The temperature amplitude of the acoustic field 204 is the maximum change in the temperature of the medium from its mean value. The intensity of the acoustic field 204 is the amount of energy that acoustic waves carries per unit area. The power of the acoustic field 204 is the rate at which energy is transferred by the waves. The operating parameters of the acoustic field 204 are the conditions under which the acoustic field 204 is generated and propagated. These parameters include the frequency or frequencies of the acoustic field 204, the wavelength or wavelengths of the acoustic field 204, the density amplitude of the acoustic field 204, the pressure amplitude of the acoustic field 204, and the temperature amplitude of the acoustic field 204. There are a variety of different types of acoustic fields 204 that can be used in the sound pressure level metrology instrument 200. These types of acoustic fields 204 include simple waves such as plane waves, spherical waves, and cylindrical waves, as well as waves that are combinations of these simple waves, and which may be combinations of a few such simple waves, or may be complex fields (e.g. "diffuse fields") consisting in principle of combinations of large numbers of such simple waves. The combination of simple waves constituting a complex field may not be known. The acoustic field 204 can include speech, music, and environmental noise as produced from various sources including industrial processes, such as manufacturing and construction.

In an embodiment, the acoustic field 204 is created in acoustic enclosure 210 that is an acoustic resonator, and the optical cavity 203 is disposed to measure the acoustic field at the location of the optical cavity in the resonator. In an embodiment, the acoustic field 204 is created in acoustic enclosure 210 that is an acoustic cavity with dimensions that are short compared to the wavelength of the highest acoustic frequency of interest, and the optical cavity is disposed to measure the acoustic field in the acoustic cavity.

In an embodiment the acoustic field 204 is created in an acoustic enclosure 210 such as a room, that has irregular boundaries and the boundaries of which may not be fully known or defined, and the optical cavity is disposed to measure the acoustic field in the in the acoustic enclosure. The shape and size of such an acoustic enclosure can be arbitrary and may not be known.

In an embodiment, the acoustic field 204 exists in an arbitrary environment which may not have any defined boundaries and which as such may be described as an open environment, and the optical cavity 203 is disposed to measure the acoustic field at the location of the optical cavity in the arbitrary environment.

In an embodiment, sound source driver 211 drives sound source 206 to produce acoustic field 204 that is used to modulate the index of refraction of the acoustic medium 205 inside the optical cavity 203. The sound source driver 211 controls sound source 206 to produce a selected range of acoustic frequencies and intensities. The output level of the sound source 206 can be controlled by driver signal 218 that is applied to sound source 206 from sound source driver 211. The driver signal 218 controls the amplitude and frequency of the acoustic field 204 that the sound source 206 generates. The voltage of driver signal 218 that is applied to the sound source 206 can determine current that flows through the sound source 206 or power that is dissipated by the sound source 206. The sound source driver 211 can be a computer or operated by a computer or on-board operating instructions. The sound source driver 211 can be a function generator that can generate a variety of waveforms, including sine waves, square waves, and triangular waves. The function generator can be set to generate a sine wave with the desired frequency and amplitude. The sound source driver 211 can be a microcontroller that can be programmed to generate a waveform with the desired frequency and amplitude.

The driver signal 218 is the signal that is used to drive sound source 206. The driver signal 218 can be a sinusoidal signal with a frequency that is selected to be within the bandwidth of sound source 206. The amplitude of the driver signal 218 can be adjusted to control the power of sound source 206. The driver signal 218 can be generated using a variety of methods or devices, including a function generator. The driver signal 218 can be a digital signal or an analog signal. The type of signal used can depend on the type of sound source 206 that is being used. The driver signal 218 can be a single-ended signal. However, it can also be a differential signal. The driver signal 218 can be a voltage signal or a current signal. The type of signal used can depend on the type of sound source 206 that is being used. The driver signal 218 can be a unipolar signal or a bipolar signal that depends on the type of sound source 206 that is being used. The driver signal 218 can be a positive-going signal or a negative-going signal. The driver signal 218 can be a continuous signal or a pulsed signal. The driver signal 218 can be a symmetrical signal or an asymmetrical signal. The driver signal 218 can be a linear signal or a nonlinear signal.

The optical cavity 203 of the sound pressure metrology instrument 200 allows the instrument to determine sound pressure by measuring the index of refraction of acoustic medium 205. The optical cavity 203 can be a resonant cavity that includes two parallel mirrors. The distance between the mirrors can be precisely controlled, and the cavity can be filled with acoustic medium 205. When acoustic field 204 is present in acoustic medium 205, it causes the index of refraction of acoustic medium 205 to vary. This variation in the index of refraction is detected by optical cavity 203, which produces acoustic-modified light 215 from source light 214 that is functionally dependent on the sound pressure. The optical cavity 203 can have more than two mirrors, arranged to form an optical ring resonator. The optical cavity 203 can have no discrete mirrors but instead guide the light by internal reflection at a material interface or from a reflection by a pattern of holes or other refractive index variations in a solid structure. The optical cavity 203 can be a solid state optical cavity that interacts with the acoustic medium via the evanescent part of the cavity light. A solid state optical cavity can be a photonic crystal cavity, an optical fiber cavity, a continuous total internal reflection resonator, a discrete total internal reflection resonator, or a waveguide structure.

The optical cavity 203 provides a sensitive and accurate way to measure the index of refraction of acoustic medium 205. Coatings and materials used for optical cavity 203 can be selected for operation with laser wavelengths for source light 214 and acoustic-modified light 215.

In an embodiment, optical cavity 203 is a prismatic structure (e.g. a cylinder, rectangular prism and the like) that can include optical material and supporting mechanical structures, e.g., glass, metal, and the like. The length of optical cavity 203 can be on the order of centimeters, and the diameter of the cavity can be on the order of millimeters although size is arbitrary and can be sized for the particular implementation. The mirrors of optical cavity 203 can be made of highly reflective material at the wavelength of source light 214 and acoustic-modified light 215.

The optical cavity can be filled with or disposed in acoustic medium 205, which can be a gas or liquid.

The output signal of the optical cavity can be proportional to the sound pressure. The range of outputs that can be measured by the optical cavity can depend on the sensitivity of the optical cavity and the amplitude of acoustic field 204. The sound pressure can have values ranging from −20 dB to 200 dB, and the optical cavity can be used to measure sound pressure levels over this entire range or a narrower range.

The optical cavity 203 can be operated by sending source light 214 into optical cavity 203. The light circulates in the optical cavity, and the index of refraction of the acoustic medium causes the light to be refracted. The amount of refraction can be proportional to the sound pressure, and this can be detected by measuring acoustic-modified light 215 produced from source light 214.

The optical cavity can be operated at a constant mean temperature and mean pressure so that the mean index of refraction of the acoustic medium is stable.

There are a variety optical cavity 203 that can be used to measure sound pressure level, including a Fabry-Perot cavity. The Fabry-Perot cavity is a resonant cavity that includes two parallel mirrors. Another type of optical cavity 203 is the ring cavity that includes mirrors arranged so that light waves travel around the ring in a continuous loop. The optical cavity 203 can have no discrete mirrors but instead guide the light by internal reflection at a material interface or from a reflection by a pattern of holes or other refractive index variations in a solid structure. The optical cavity 203 can be a solid state optical cavity that interacts with the acoustic medium via the evanescent part of the cavity light. A solid state optical cavity can be a photonic crystal cavity, an optical fiber cavity, a continuous total internal reflection resonator, a discrete total internal reflection resonator, or a waveguide structure.

In an embodiment, optical cavity 203 is constructed in a small and portable form factor that can be used as an intrinsically traceable microphone in arbitrary acoustic environments. Intrinsically traceable refers to configuration wherein that the microphone does not require calibration in order to give accurate measurement results in SI units, or equivalently in any system of physical units with defined conversion coefficients to SI units.

It is contemplated that the sensitivity of measurement of the refractive index can be enhanced when optical cavity 203 is a high-finesse optical cavity, wherein high-finesse optical cavity refers to an optical structure in which reflection of light at one or more interfaces produces interference such that the variation of relative transmitted intensity with optical frequency is steeper than a sinusoidal variation.

Figure 6:
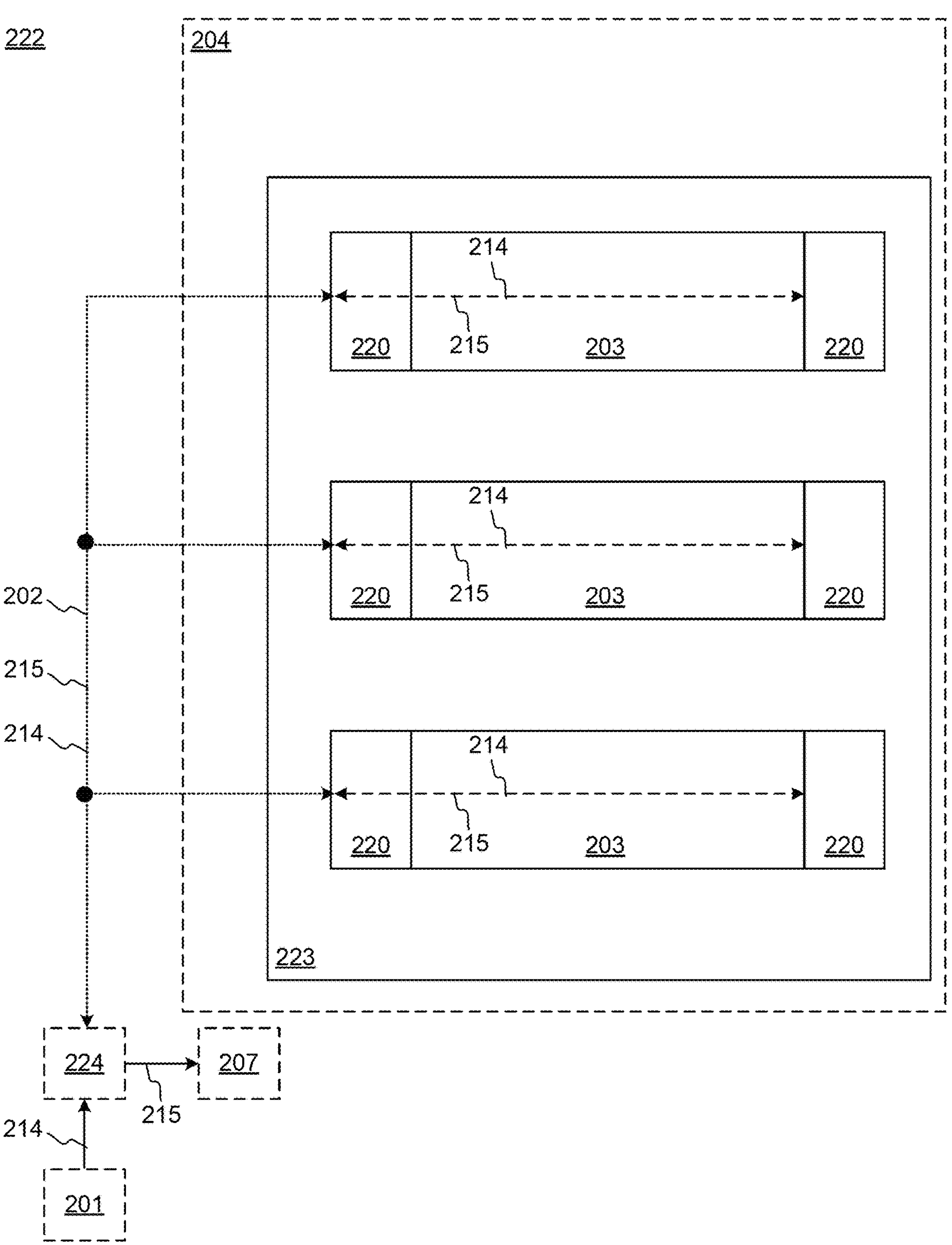
FIG. 6 shows, according to some embodiments, an optical cavity assembly.
Figure 7:
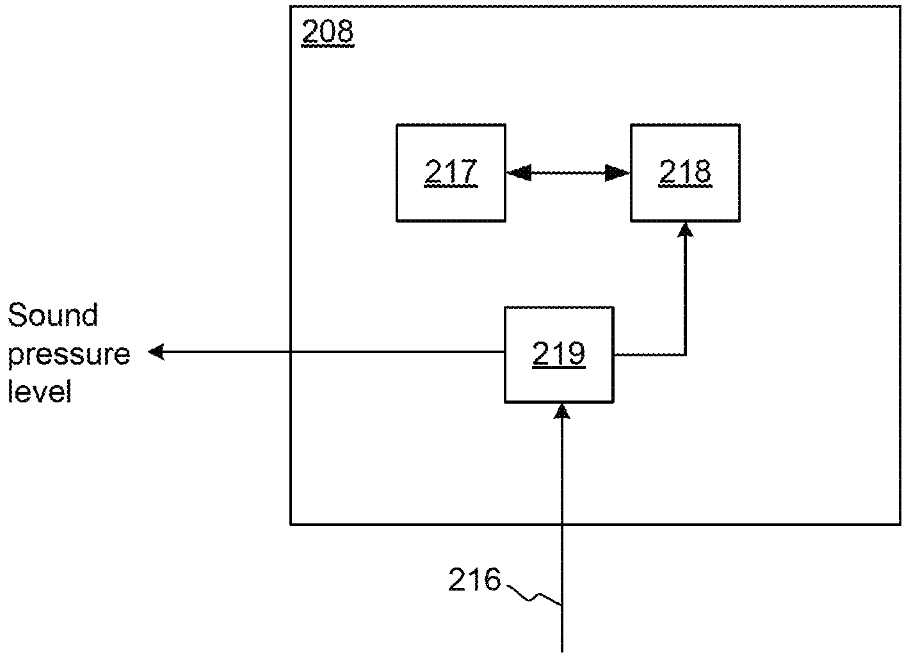
FIG. 7 shows, according to some embodiments, an analyzer module.
Figure 8:
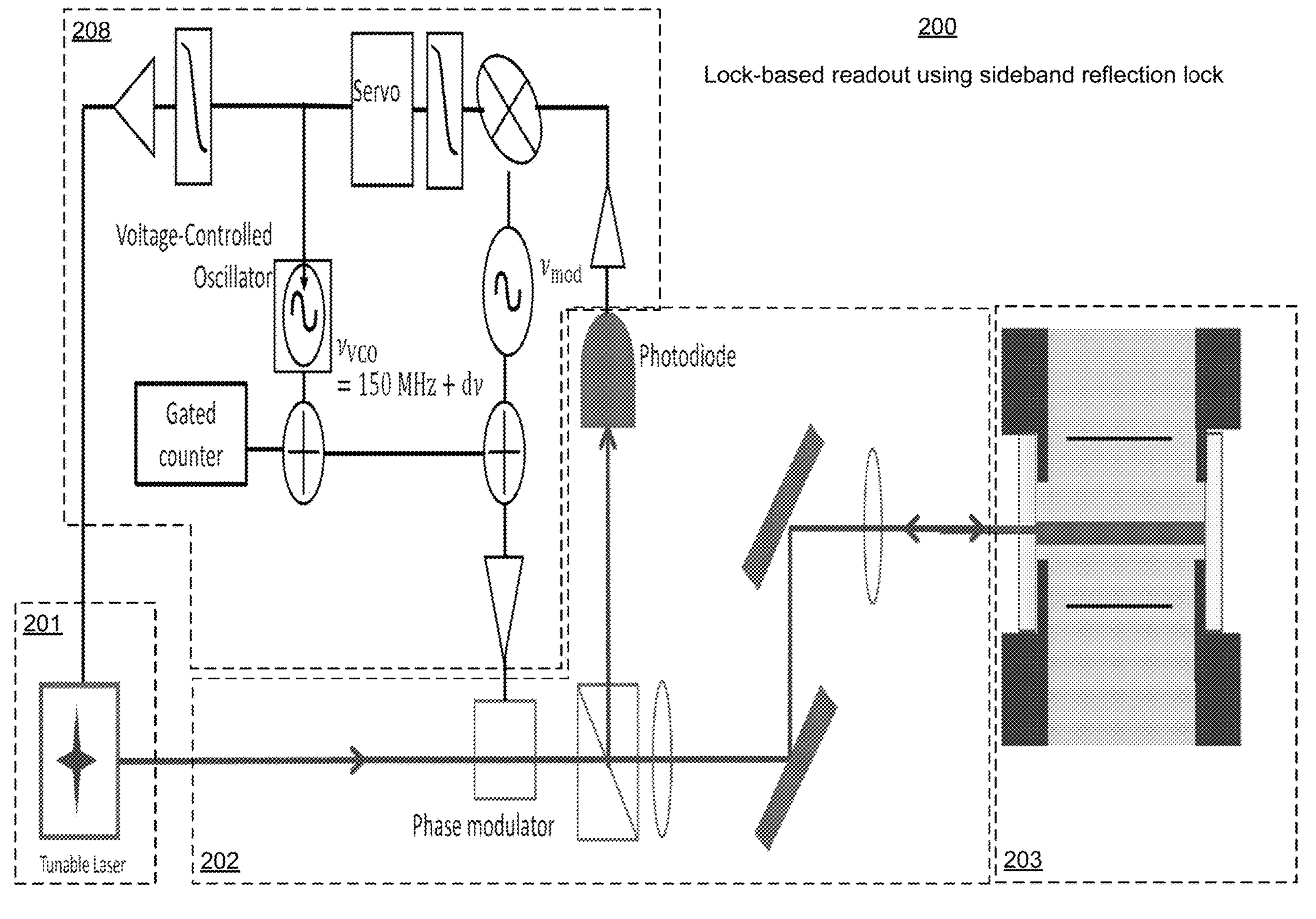
FIG. 8 shows, according to some embodiments, a sound pressure metrology instrument.

In an embodiment, with reference to FIG. 6, optical cavity 203 functions as a microphone, wherein light is coupled into an optical cavity that is open to its fluid environment. The optical cavity 203 can include additional cavities to cancel dimensional variation or other effects. The microphone provides primary measurement of the local sound level, such that the microphone is intrinsically traceable. This measurement can be used to calibrate other devices such as sound sources and microphones.

The acoustic medium 205 is a substance that supports an acoustic field and is used to couple the acoustic field 204 produced by the sound source 206 to the source light 214 in the optical cavity 203. The acoustic medium 205 can have a high derivative of index of refraction with respect to density so that the acoustic field 204 can couple efficiently to the source light 214. The acoustic medium 205 can also be transparent to the source light 214 so that the source light 214 can propagate through the acoustic medium 205 without being absorbed. The acoustic medium and other materials, including optical cavity 203, through which light is passing can be made of a material that is transparent to the light.

The acoustic medium 205 can include a variety of materials, including gases, liquids, and solids. The acoustic medium 205 can also be made of a composite material, such as a gas-liquid mixture or a solid-liquid mixture. The acoustic medium 205 can support acoustic pressures in the range of acoustic field 204. The acoustic medium 205 supports operation at a selected mean temperature and mean pressure.

In an embodiment, with reference to FIG. 3, the sound pressure metrology instrument 200 can be used to calibrate a microphone 212. Microphone signal 219 is a signal that is generated by microphone 212 in response to acoustic field 204 and can take a variety of forms such as an electrical voltage signal, an electrical current signal, or an optical signal. Microphone signal 219 is commonly proportional to a property of acoustic medium 204 for example the acoustic pressure or the acoustic particle velocity. By measuring the sound pressure at the location of optical cavity 203 and recording the corresponding value of the microphone signal 219 the sound pressure metrology instrument 200 can calibrate the output of microphone 212 with respect to the properties of the acoustic field 204 at the location of the optical cavity 203, at the location of the microphone 212, or at another location. This calibration allows the microphone 212 to measure sound in terms of SI traceable physical units. The calibration can include information about the amplitude of the response of the microphone to sound, or information about the time delay or phase of the response of the microphone to sound. The response of the microphone to sound may be linear, in which case the calibration can be represented as a sensitivity coefficient. The sensitivity coefficient may depend on the acoustic frequency. The sensitivity coefficient may be complex so as to represent both amplitude and phase information.

Microphone 212 can be disposed in the acoustic field 204. The microphone signal 219 can be sent to a preamplifier, oscilloscope, or analyzer module 208. The acoustic field 204 is applied to the microphone 212, and the microphone signal 219 is displayed on the oscilloscope or subject to analysis in combination with acoustic-modified signal 216 by analyzer module 208.

The optional acoustic enclosure 210 of the sound pressure metrology instrument 200 is a housing that encloses the acoustic field 204. The acoustic enclosure 210 is made of a material that is largely acoustically opaque to acoustic field 204 produced by sound source 206.

The acoustic enclosure 210 can be made of various materials such as metal, wood, ceramic, glass, plastic, and the like. The thickness of the acoustic enclosure 210 can be on the order of a few millimeters or centimeters. The acoustic enclosure 210 may also be made of a porous material, such as a foam or a felt. Porous materials can be used in acoustic enclosures to reduce the amount of acoustic energy that is reflected back into the optical cavity 203, back to sound source 206, or back to microphone 212. The acoustic enclosure can be made of a combination of different materials. The acoustic enclosure 210 can be of a variety of shapes which may be regular such as a cylinder or rectangular prism, or which may be irregular. The dimensions of the acoustic enclosure 210 can be chosen to optimize the performance of the sound pressure metrology instrument 200. For example, the dimensions of the acoustic enclosure 210 can be chosen to maximize the interaction between the acoustic field 204 and the source light 214.

The acoustic enclosure 210 can allow acoustic field 204 to be produced by the sound source 206 in a direction that is at a selected angle, e.g., perpendicular or at an oblique, to the optical cavity 203. This allows the acoustic field 204 to interact with source light 214 in a geometry that increases the effect on the acoustic-modified light 215 of the modulations in the index of refraction of the acoustic medium 205 inside the optical cavity 203.

Figure 4:
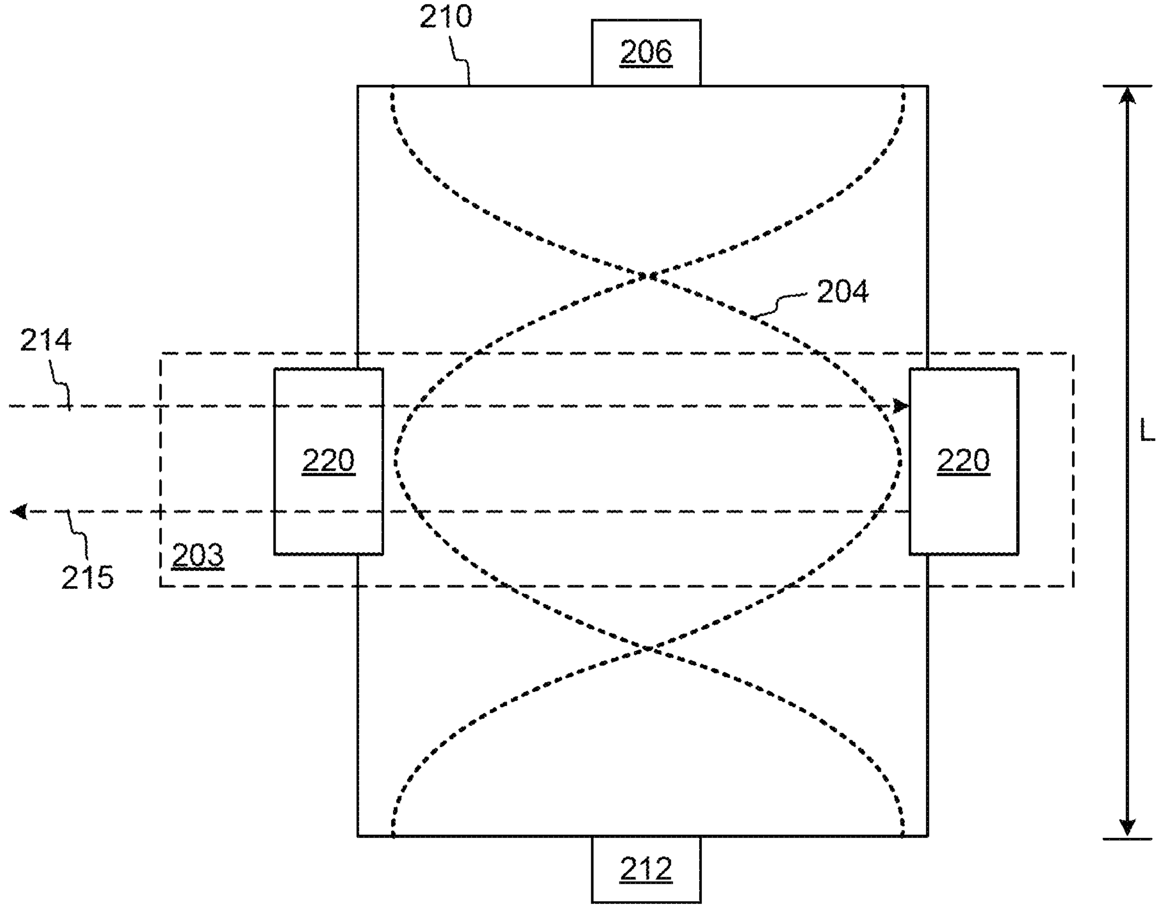
FIG. 4 shows, according to some embodiments, an optical cavity disposed in an acoustic enclosure of a sound pressure metrology instrument, wherein the acoustic enclosure is an acoustic resonator.

In an embodiment, with reference to FIG. 4, the acoustic resonator is an acoustic enclosure with dimensions such that standing sound waves are supported at chosen frequencies. Such a standing wave establishes a relation between the sound level at the location of the optical cavity and the location of the acoustic device under test. The resonator could be made variable in dimension (e.g. length), such that the supported acoustic resonance frequencies are continuously tunable. A fixed-length resonator of length L can be used to support standing acoustic plane waves at acoustic wavelengths $\lambda_{ac}$=UN where N is an integer. Plane means that the acoustic wavefronts are flat or nearly flat.

Figure 5:
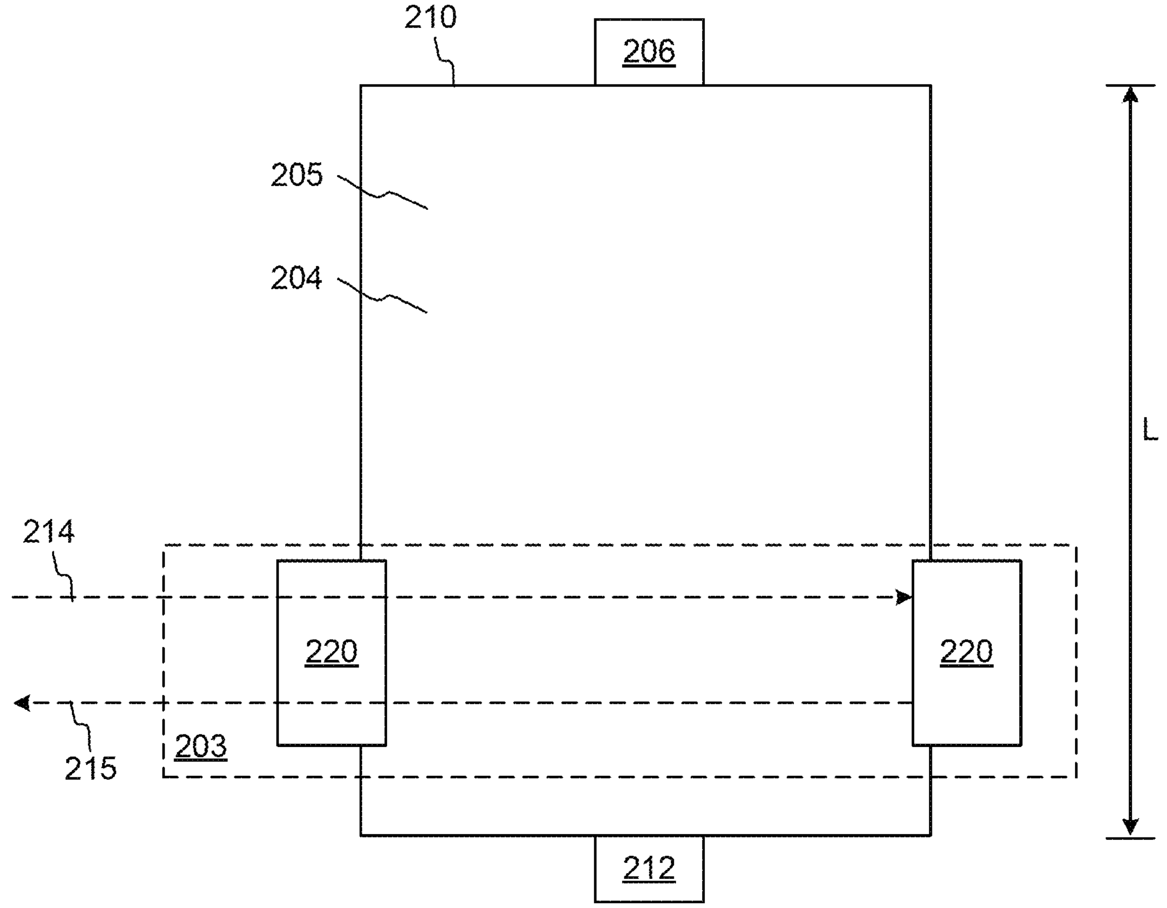
FIG. 5 shows, according to some embodiments, an optical cavity disposed in an acoustic enclosure of a sound pressure metrology instrument, wherein the acoustic enclosure is an acoustic coupler.

In an embodiment, with reference to FIG. 5, the acoustic coupler is an acoustic enclosure with dimensions sufficiently small such that there is not much difference between the sound level at the location of the optical cavity and the location of the acoustic device under test, regardless of their relative positions in or on the acoustic enclosure. The difference can be sufficiently small as to be negligible or can be corrected by an accurate acoustic model of the enclosure. Here, there can be a uniform acoustic field with $L \ll \lambda_{ac}$.

In an embodiment, with reference to FIG. 3, a microphone receiver 213 can be used in conjunction with a microphone 212. The microphone receiver 213 in combination with microphone 212 converts acoustic energy into an output that is typically electrical. The microphone receiver 213 can output a range of electrical signals, depending on the strength of the acoustic energy that is incident on the device. The output signal of the microphone receiver 213 can be proportional to the sound pressure of the acoustic energy. The microphone receiver 213 can be operated in a wide range of temperatures and humidity conditions. It can be operated in a variety of acoustic environments, including noisy environments and environments with reverberation. The output signal of microphone receiver 213 can be of a non-electrical nature, for instance optical. The output of microphone receiver 213 can be analog or digital, The acoustic signal 221 is a signal that is produced by microphone receiver 213 in response to the acoustic field 204 produced by the sound source 206. The acoustic signal 221 is a measure of the sound pressure of the acoustic field 204. The acoustic signal 221 can be a time-varying signal that has a frequency spectrum that can be centered around the frequency of the acoustic field 204. The acoustic signal 221 can be analog or digital in nature. The amplitude of the acoustic signal 221 can be proportional to the sound pressure of the acoustic field 204.

In an embodiment, the sound pressure metrology instrument 200 can include a supplemental sensor 209. The supplemental sensor 209 can measure one or more properties of the acoustic medium such as a temperature, humidity, static background pressure, or composition of the acoustic medium 205 in the optical cavity 203; or one or more properties of the source light 214 or the acoustic-modified light 215 such as the optical frequency or wavelength; or one or more properties of the optical cavity 203 such as motion of the optical cavity mirrors; or one or more properties of the acoustic enclosure 210 such as temperature or motion of the acoustic enclosure surfaces. The supplemental sensor 209 can be any type of sensor that can measure one or more of these parameters. Some examples of supplemental sensors include temperature sensors, humidity sensors, pressure sensors, mass spectrometers, chromatographs, and wavemeters. The supplemental sensor 209 can be located in close proximity to the optical cavity 203 in order to minimize the effects of environmental variations on the measurements. The supplemental sensor 209 can be housed in a protective enclosure to protect it from the environment. The supplemental sensor 209 can be composed of several similar or different sensors, which may be located together or be distributed across different positions.

The supplemental sensor 209 can be connected to the analyzer module 208 via a wired or wireless connection. The supplemental sensor 209 transmits the measured values to the analyzer module 208, which incorporates the measured values in the determination of the sound pressure level. The supplemental sensor 209 can be calibrated to a known value in order to ensure accurate measurements. The calibration process can involve exposing the supplemental sensor 209 to a known value of each parameter being measured and then adjusting the sensor to read that value.

The supplemental sensor 209 can be used to improve the accuracy of the sound pressure measurements that are determined in analyzer module 208 by compensating for environmental variations and other variations. By measuring and correcting for these variations, the supplemental sensor 209 can improve the accuracy of the measurements of the sound pressure.

The range of supplemental sensor signal 217 output by supplemental sensor 209 depends on the type of sensor. For example, a temperature sensor may have a range of outputs from −50° C. to 150° C., while a humidity sensor may have a range of outputs from 0% to 100% RH. The operating parameters of the supplemental sensor 209 can depend on the type of sensor.

The operation and construction of the supplemental sensor 209 depends on the type of sensor. For example, a temperature sensor can be operated by connecting it to a power supply and then placing it in the environment where the temperature is to be measured. A humidity sensor can be operated by connecting it to a power supply and then placing it in the environment where the humidity is to be measured.

Temperature sensors can measure the temperature of the acoustic medium 205 in the optical cavity 203. This information is used to correct for any variations in the pressure derivative of the index of refraction of the acoustic medium 205 that can be caused by changes in temperature. Humidity sensors measure the humidity of the acoustic medium 205 in the optical cavity 203. This information is used to correct for any variations in the pressure derivative of the index of refraction of the acoustic medium 205 that can be caused by changes in humidity. Pressure sensors measure the mean of the acoustic medium 205 in the optical cavity 203. This information is used to correct for any variations in the pressure derivative of the index of refraction of the acoustic medium 205 that can be caused by changes in mean pressure. Mass spectrometers measure the composition of the acoustic medium 205 in the optical cavity 203. This information is used to correct for any variations in the pressure derivative of the index of refraction of the acoustic medium 205 that can be caused by changes in the composition of the medium. Chromatographs measure the concentration of different components in the acoustic medium 205 in the optical cavity 203. This information is used to correct for any variations in the pressure derivative of the index of refraction of the acoustic medium 205 that can be caused by changes in the concentration of the components. Wavemeters measure the optical frequency or wavelength of the source light 214 or the acoustic-modified light 215. This information is used to correct for any variations in the pressure derivative of the index of refraction of the acoustic medium 205 that can be caused by changes in the optical frequency or wavelength of the light.

The supplemental sensor signal 217 is produced by supplemental sensor 209 and communicated to analyzer module 208. The supplemental sensor signal 217 is used to correct for any variations in the acoustic medium 205, source light 214, acoustic-modified light 215, optical cavity 203, or acoustic enclosure 210 that affects accuracy of the sound pressure measurement. The supplemental sensor signal 217 can be a voltage, current, or frequency signal. The range of outputs of the supplemental sensor signal 217 can depend on the type of supplemental sensor 209 used. The operating parameters of the supplemental sensor signal 217 can also depend on the type of supplemental sensor 209 used. The supplemental sensor signal 217 can be analog or digital in nature. The supplemental sensor signal 217 can be communicated to the analyzer module 208 using a wired connection. However, it is also possible to communicate the supplemental sensor signal 217 using a wireless connection.

The photodetector 207 converts light energy of acoustic-modified light 215 into electrical energy and detects acoustic-modified light 215 produced by the optical cavity 203 in response to the acoustic field 204 from the sound source 206. The photodetector 207 produces an acoustic-modified signal 216 from the acoustic-modified light 215, which is then communicated to the analyzer module 208. The photodetector 207 can be selected and designed to ensure that it is sensitive to the acoustic-modified light 215 and that it produces a high-quality acoustic-modified signal 216.

The photodetector 207 can be a semiconductor device that is made of a material that is sensitive to light. An exemplary photodetector is a photodiode. A photodiode is a semiconductor device that has a p-n junction. When light strikes the p-n junction, it creates an electron-hole pair. The electrons and holes are separated by the electric field at the p-n junction, and this creates a current flow. The current flow is proportional to the intensity of the light, so the photodiode can be used to detect the intensity of the acoustic-modified light 215. The photodetector 207 can be mounted on a printed circuit board (PCB). The PCB can be connected to the analyzer module 208, which processes the acoustic-modified signal 216 to determine the sound pressure level of the acoustic field 204.

The acoustic-modified signal 216 is produced by photodetector 207 in response to the acoustic-modified light 215. The acoustic-modified light 215 is produced by the optical cavity 203 in response to the interaction of the source light 214 with the acoustic field 204. The acoustic-modified signal 216 encodes the modulations in the index of refraction of the acoustic medium 205 inside the optical cavity 203 due to the acoustic field 204.

The acoustic-modified signal 216 can be a complex signal that contains both amplitude and phase information. In an embodiment, the amplitude of the acoustic-modified signal 216 is proportional to the magnitude of the modulations in the index of refraction of the acoustic medium 205 inside the optical cavity 203, and the phase of the acoustic-modified signal 216 is proportional to the phase of the modulations in the index of refraction of the acoustic medium 205 inside the optical cavity 203.

The acoustic-modified signal 216 can be in the range of 10 mV to 10 V. The frequency of the acoustic-modified signal 216 can be in the range of 0.001 Hz to 100 GHz.

The acoustic-modified signal 216 can be used to measure the sound pressure of a wide range of acoustic fields. The sound pressure of an acoustic field can be determined by measuring the frequency, phase or amplitude of the acoustic-modified signal 216.

The analyzer module 208 of the sound pressure metrology instrument 200 determines the sound pressure of the acoustic field 204 produced by the sound source 206 from the modulations in the index of refraction of the acoustic medium 205 inside the optical cavity 203 encoded in the acoustic-modified light 215. The analyzer module 208 can include various signal modification, transformation and processing components such as signal mixers, signal splitters, digital signal processors, amplifiers, attenuators, oscillators, frequency counters, time interval analyzers, integrators, differentiators, spectrum analyzers, and the like. The analyzer module 208 can include a processor 217, a memory 218, and an input/output (I/O) interface 219. The processor 217 is configured to execute instructions stored in the memory 218 to determine the sound pressure level of the acoustic field 204. The I/O interface 219 is configured to receive the acoustic-modified signal 216 from the photodetector 207 and to output the sound pressure of the acoustic field 204. In an embodiment the I/O interface does not directly output the sound pressure but outputs a one or more quantities or signals from which the user can readily determine the sound pressure level without having performed a calibration of sound pressure metrology instrument 200.

The processor 217 can be any type of processor suitable for executing instructions. For example, the processor 217 can be a general-purpose microprocessor, a digital signal processor (DSP), or a field-programmable gate array (FPGA). The memory 218 can be any type of memory suitable for storing instructions and data. For example, the memory 218 can be a random-access memory (RAM), a read-only memory (ROM), or a flash memory. The I/O interface 219 can be any type of interface suitable for receiving the acoustic-modified signal 216 and outputting the sound pressure of the acoustic field 204. For example, the I/O interface 219 can be an analog electrical input, a serial interface, a parallel interface, a network interface, or removable media.

The analyzer module 208 can be implemented in any suitable manner. For example, the analyzer module 208 can be implemented as a single integrated circuit, or it can be implemented as a plurality of interconnected integrated circuits. The analyzer module 208 may also be implemented in whole or in part as a software program running on a general-purpose computer. The analyzer module 208 may encompass a variety of separate signal modification, transformation and processing instruments and components.

The analyzer module 208 can be configured to output the sound pressure in a variety of units, such as decibels (dB), pascals (Pa), or newtons per square meter ($N/m^2$). The analyzer module 208 may also be configured to output the sound pressure in a variety of frequency ranges, such as the audible range (20 Hz to 20 kHz), the infrasonic range (less than 20 Hz), or the ultrasonic range (greater than 20 kHz). The analyzer module 208 is capable of determining sound pressures in a wide range of values, typically from 0 dB to 160 dB. The analyzer module **208*l*** may also be configured to determine sound pressures in a specific frequency range, such as the audible range (20 Hz to 20 kHz).

Various perturbations of the components of sound pressure metrology instrument 200 are contemplated. The acoustic environment can be a resonator, cavity, or open (e.g., as in an optical microphone). The acoustic-modified signal 216 and from thence the changes in acoustic modified light 215 from source light 214 can be observed by using a lock (e.g., Pound-Drever-Hall lock, side-of-fringe transmission lock, side-of-fringe reflection lock, dither lock, dual sideband lock, and the like), an optical frequency comb, and the like. The resonant frequency shift of optical cavity 203 can be determined from an applied frequency shift applied to source light 214 and measured by a frequency counter, a voltage proportional to a frequency shift applied to source light 214 and measured by a voltage measuring device, a beat of source light 214 against an optical reference of stable frequency, and the like. The method of establishing SI traceability can include using accurately known properties (especially pressure derivative of the refractive index under the applicable thermodynamic boundary conditions) of air used as the acoustic medium 204, of nitrogen used as the acoustic medium 205, of helium used as the acoustic medium 205, and the like. The geometry of optical cavity 203 can include a Fabry-Perot cavity, ring cavity, whispering gallery resonator, or photonic crystal, and the like.

The addition of an acoustic resonator can provide disposal of an optical cavity 203 and microphone to be calibrated 212 at locations in acoustic medium 205 to experience the same sound pressure. The acoustic resonator can amplify the magnitude of the sound pressure to improve the signal-to-noise ratio of the measurement.

The optical cavity 203 can function as a microphone (e.g., can be miniature, portable, sufficiently robust, and the like) that is intrinsically traceable (i.e., would not require calibration) and can calibrate other microphones in a variety of measurement settings. With helium as acoustic medium 205 in optical cavity 203, the relationship between sound pressure can be based on ab initio atomic calculations so that the sound pressure measurements of sound pressure metrology instrument 200 are traceable to a quantum standard. The properties (especially pressure derivative of the refractive index under the applicable thermodynamic boundary conditions) of an acoustic medium 205 other than helium may also be determined by ab initio calculations or by experimental comparison the properties of helium, in either case making the sound pressure measurements of sound pressure metrology instrument 200 traceable to a quantum standard.

Figure 9:
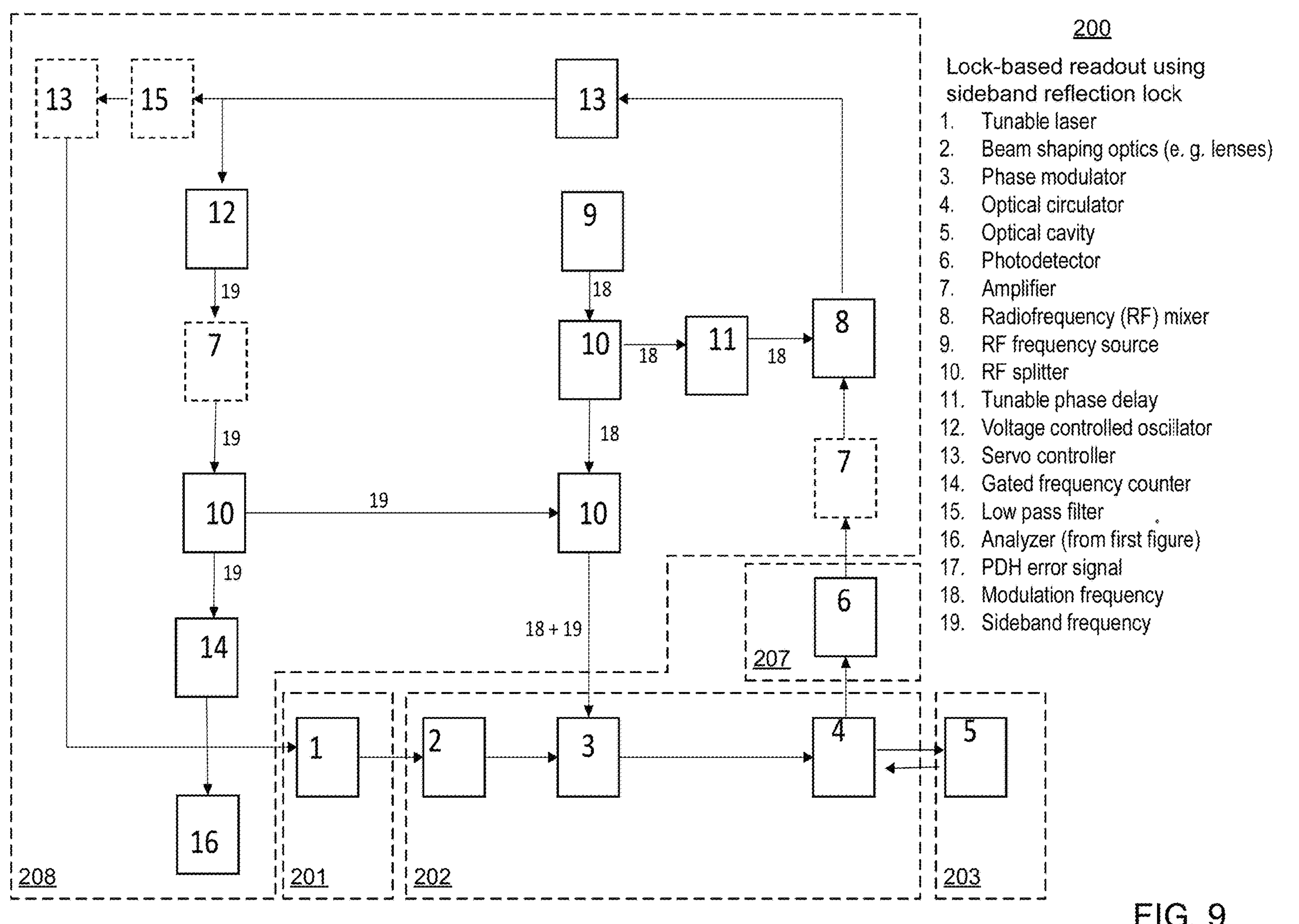
FIG. 9 shows, according to some embodiments, a sound pressure metrology instrument that includes a lock-based readout using sideband reflection lock.

It should be appreciated that various component configurations can occur in sound pressure metrology instrument 200, as shown in FIG. 8, FIG. 9, FIG. 10, FIG. 11, and FIG. 12. With reference to FIG. 9, sound pressure metrology instrument 200 includes a lock-based readout using sideband reflection lock to measure the modulation of the optical frequency resonance. Here, a phase modulator is used to generate sidebands which are separated from the laser carrier by a tunable frequency difference. The Pound-Drever-Hall (PDH) method is used to lock one of these sidebands to the optical cavity mode and the motion of the sideband is measured by a gated frequency counter. The optical light is generated by a tunable laser (1) and is transmitted to some beam shaping optics (2, e.g., a lens) to match the shape of the beam to a mode of the optical cavity. Light is modulated by a phase modulator (3) and sent via an optical circulator (4) to the optical cavity (5). A portion of the light is reflected from the cavity and returns to the optical circulator (4). The circulator directs this portion of the light to a photodetector (6). The electrical signal from the photodetector is sent to a radiofrequency (RF) mixer (8), via an optional amplifier (7). An RF frequency source (9) generates a constant frequency signal, called the modulation frequency (18) and communicates it electronically to a RF splitter (10) so that the modulation frequency can be sent to two different paths. The first path goes to a tunable phase delay (11) and then the RF mixer (8). The other path is incident on another RF splitter (10) where it is combined with another signal and sent to the phase modulator (3). A voltage controlled oscillator (VCO) (12) generates a second signal, called the sideband frequency (19). This sideband frequency is tunable based on the input voltage to the VCO and is larger than the modulation frequency. The sideband frequency is sent to another RF splitter (10). One output of the splitter is sent to another RF splitter (10) where it is combined with the modulation frequency and sent to the phase modulator (3). The other output of the splitter is sent to a gated frequency counter (14). The output of the RF mixer (8) is referred to as the PDH error signal (17) and is sent to a servo controller (13). The output of the servo controller is sent to the VCO (12) in order to lock one of the sidebands to a resonance of the optical cavity. In addition, the output of the servo controller could be sent to a low pass filter (15) and second servo controller (13) which operates at a speed much slower than the lowest acoustic frequency of interest. This second servo sends a signal to the laser (1) to keep the output of the first servo (13) centered and cancel long term drifts that can cause the system to run out of dynamic range and break lock. The frequency counter output is sent to an analyzer (16).

Figure 10:
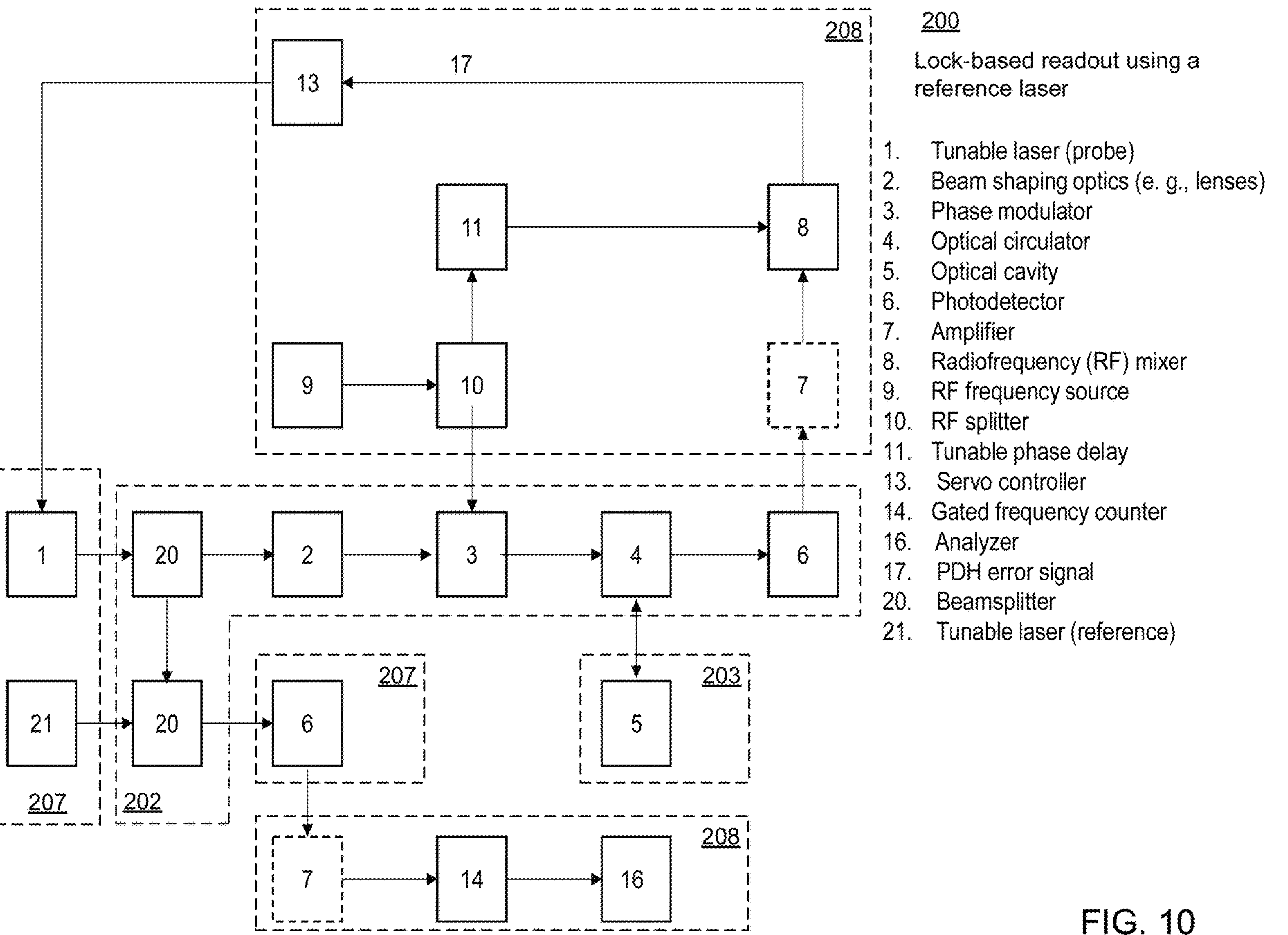
FIG. 10 shows, according to some embodiments, a sound pressure metrology instrument that includes a lock-based readout using a reference laser.

With reference to FIG. 10, sound pressure metrology instrument 200 includes a lock-based readout with a reference laser. Here, the modulation of the optical frequency resonance is measured, wherein one laser (probe laser) is frequency locked to the optical cavity mode, and the beat note between the probe laser and a second laser (reference laser) is measured by a gated frequency counter. The optical light is generated by a tunable laser (1, probe laser) and is split into two different arms by a beam splitter (20). One arm transmits to some beam shaping optics (2, e.g., one or several lenses) to match the shape of the beam to a mode of the optical cavity. The light is modulated by a phase modulator (3) and sent via an optical circulator (4) to the optical cavity (5). A portion of the light is reflected from the cavity and returns to the optical circulator (4). The circulator directs this portion of the light to a photodetector (6). The electrical signal from the photodetector is sent to a radiofrequency (RF) mixer (8) via an optional amplifier (7). An RF frequency source (9) generates a constant frequency signal that is sent to an RF splitter (10) so that the modulation frequency can be sent to two different paths. The first path goes to a tunable phase delay (11) and then the RF mixer (8). The other path is sent to the phase modulator (3). The output of the RF mixer (8) is known as the PDH error signal (17) and is sent to a servo controller (13). The output of the servo controller is sent to the probe laser (1) to lock its optical frequency to a resonance of the optical cavity. A second laser (21, reference laser) also generates light. This laser is chosen to be highly stable at the acoustic frequencies of interest and is tuned to an optical frequency that is close to that of the probe laser. The light from the reference laser and one arm of the probe laser are combined on a beam splitter (2) and communicated optically to an additional photodetector (6). This output of this photodetector is optionally amplified (7) and send to a gated frequency counter (14). The frequency counter output is sent to an analyzer (16).

Figure 11:
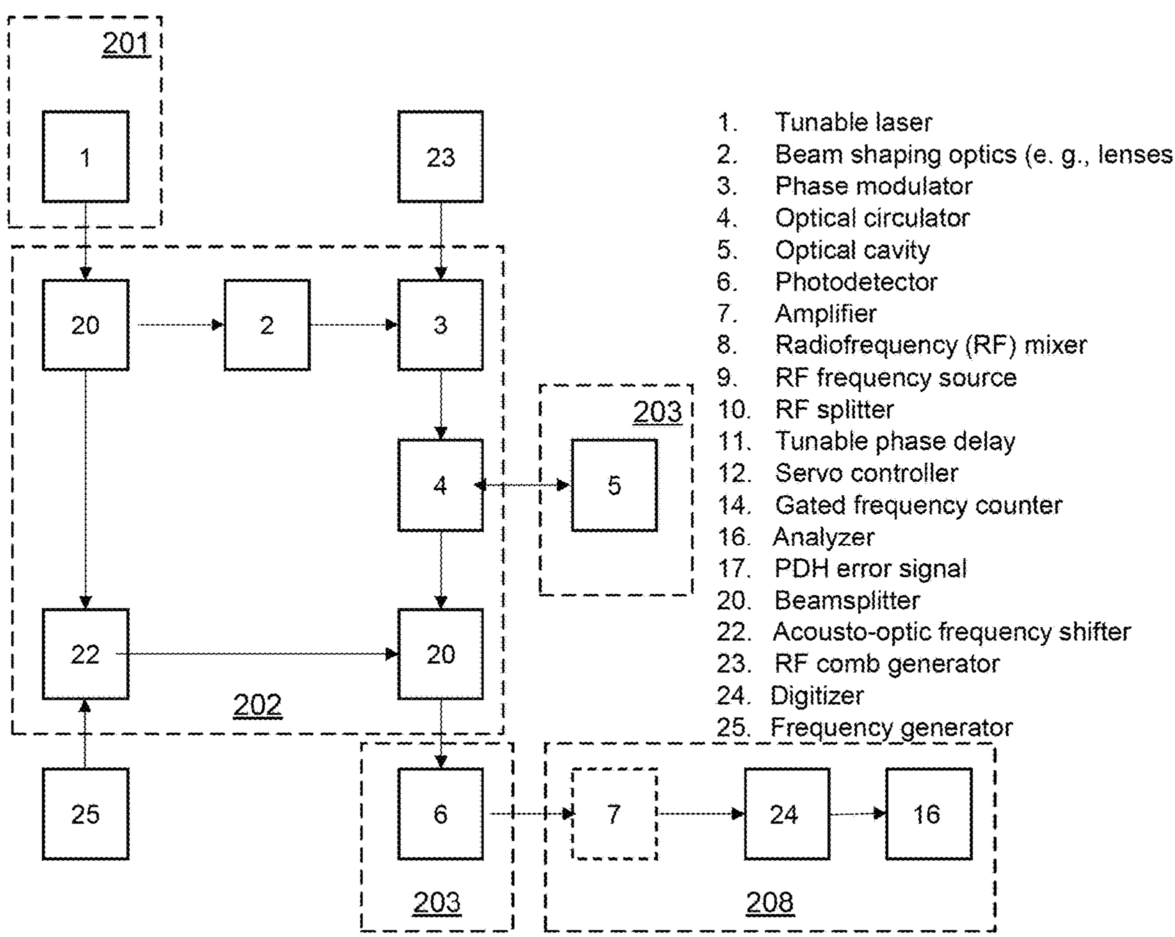
FIG. 11 shows, according to some embodiments, a sound pressure metrology instrument that includes an optical comb-based readout.
Figure 12:
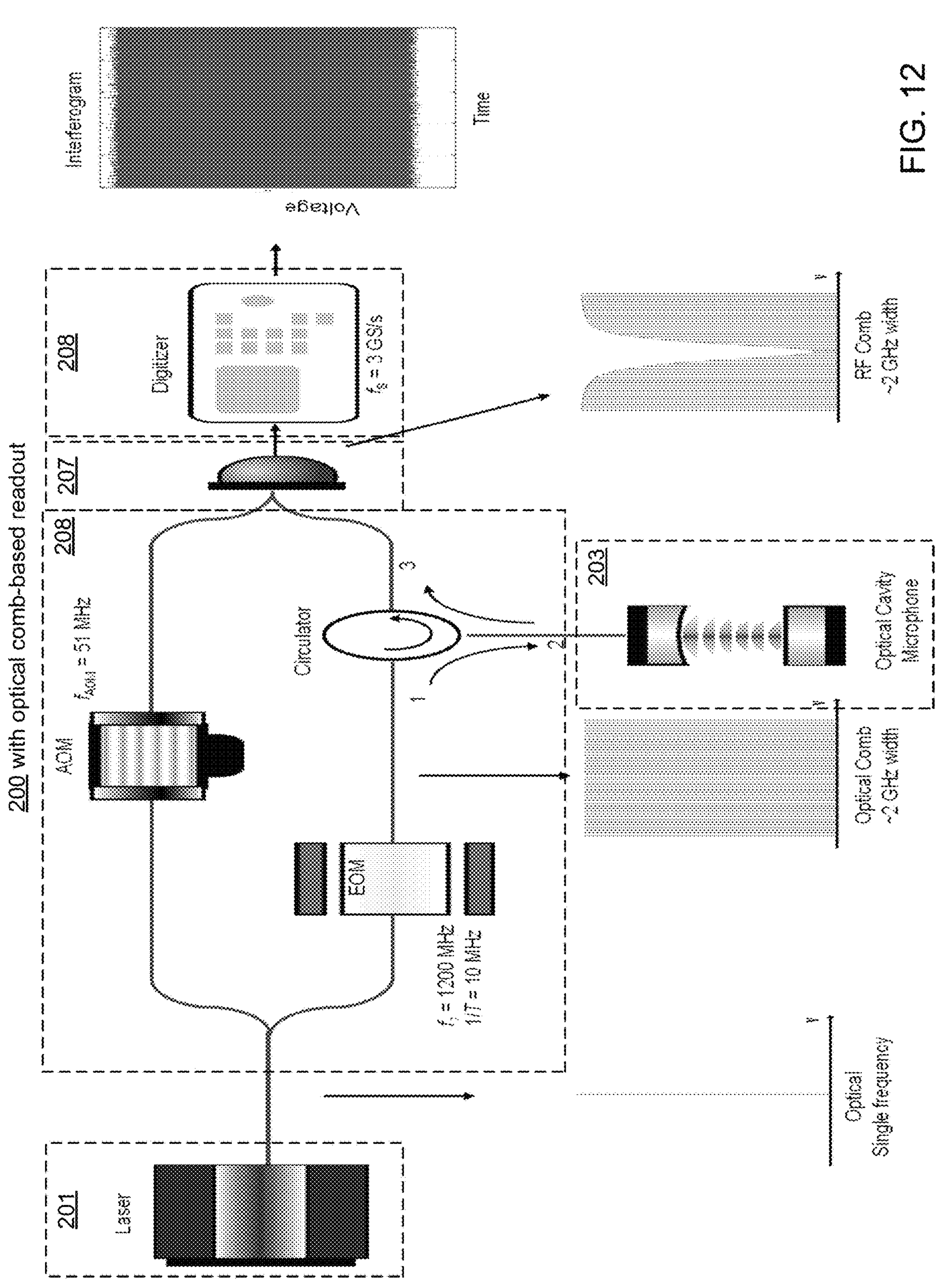
FIG. 12 shows, according to some embodiments, a sound pressure metrology instrument that includes an optical comb-based readout.
Figure 13:
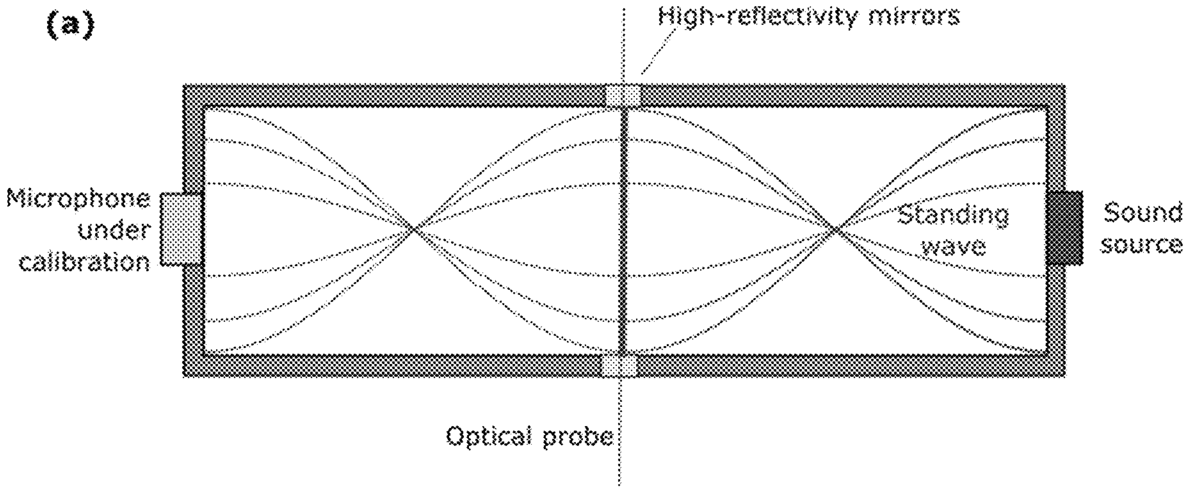
FIG. 13 shows, according to some embodiments: (a) an acoustic resonator configuration of optical sound standard. The blue curves indicate the distribution of acoustic pressure along the resonator length at different time instants; the acoustic pressure is probed at a pressure antinode of a standing plane wave. (b) An acoustic coupler configuration of optical sound standard, in which the acoustic pressure within the coupler volume is uniform.
Figure 13:
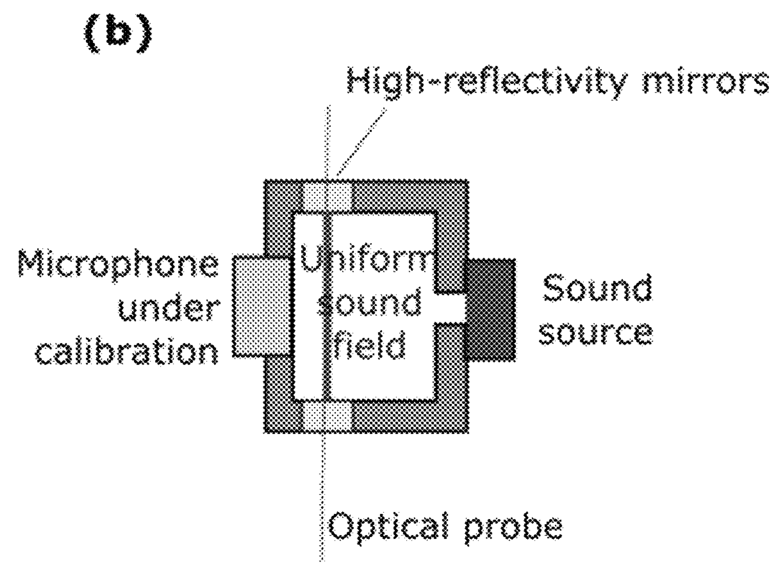
Figure 14:
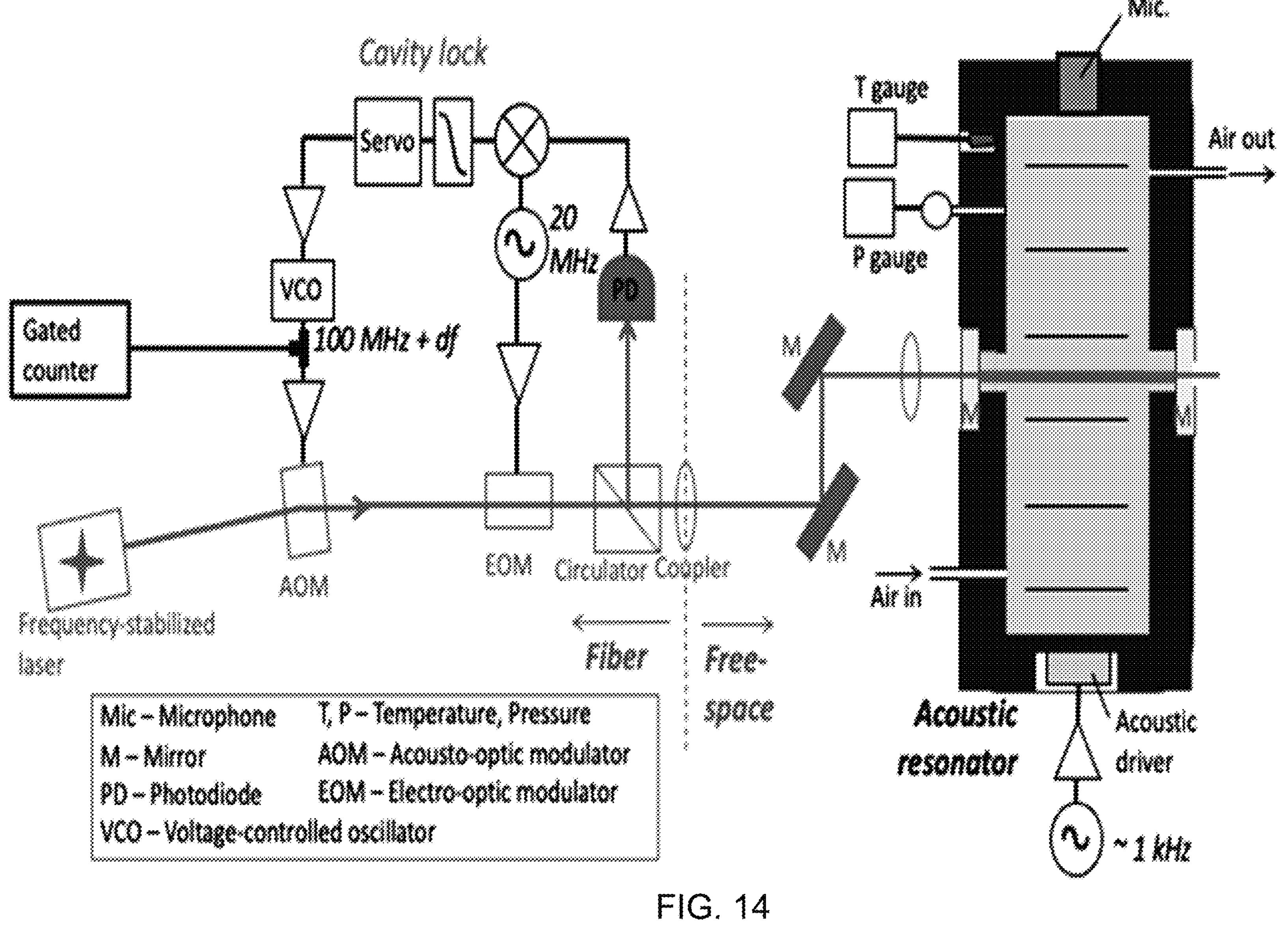
FIG. 14 shows, according to some embodiments, a Pound-Drever-Hall readout system for cavity resonance frequency tracking, wherein a gated counter with a high-repetition rate is used to make instantaneous readings of the cavity resonance frequency shift.
Figure 15:
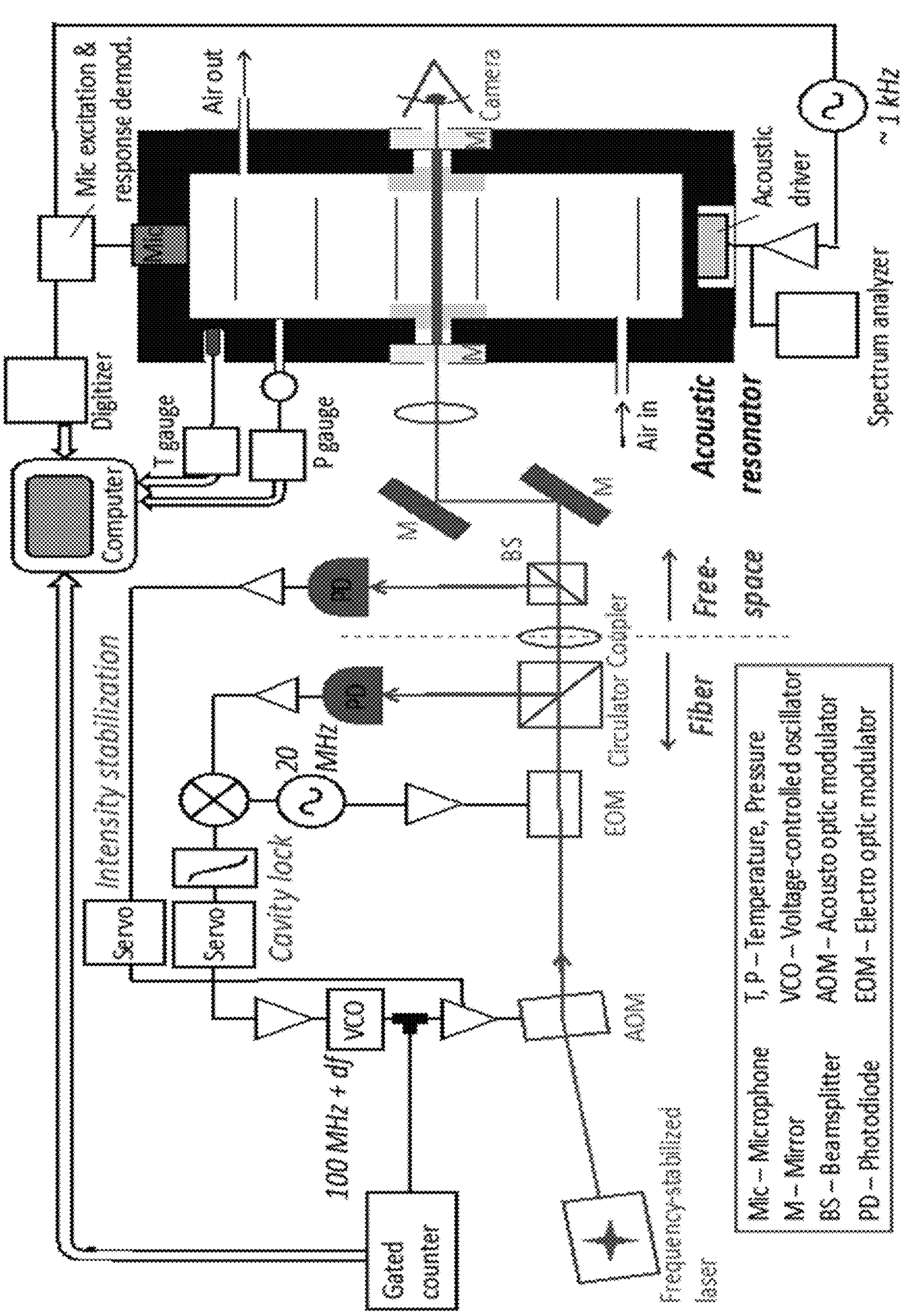
FIG. 15 shows, according to some embodiments, a primary sound standard configured for calibrating microphones, using an acoustic resonator.

With reference to FIG. 11, sound pressure metrology instrument 200 includes an optical comb-based readout. Here, the modulation of the optical frequency resonance is measured, wherein an electro-optic phase modulator is used to generate a narrow optical frequency comb. The comb is used to perform rapid spectroscopy readout of the optical cavity spectrum. The optical light is generated by a tunable laser (1) and is split into two different arms by a beam splitter (20). One arm transmits to some beam shaping optics (2, e.g., a lens) to match the shape of the beam to a mode of the optical cavity. The light is modulated by a phase modulator (3). The phase modulator is driven by an RF comb generator (23) (e.g., an RF frequency source that drives a repeating set of frequency chirps) and in turn generates an optical frequency comb. This comb is sent via an optical circulator (4) to the optical cavity (5). A portion of the light is reflected from the cavity and returns to the optical circulator (4). The second optical arm is sent to an acousto-optic frequency shifter (22). The frequency shifter is driven at a constant RF frequency by a frequency generator (25). The two optical arms are combined on a second beam splitter (20) and sent to a photodetector (6). The electrical signal from the photodetector is sent to a digitizer (24) via an optional amplifier (7).

Sound pressure metrology instrument 200 can be made in various ways. It can be appreciated that sound pressure metrology instrument 200 includes a number of optical, electrical, or mechanical components, wherein such components can be interconnected and placed in communication (e.g., optical communication, electrical communication, mechanical communication, and the like) by physical, chemical, optical, or free-space interconnects. The components can be disposed on mounts that can be disposed on a bulkhead for alignment or physical compartmentalization. As a result, sound pressure metrology instrument 200 can be disposed in a terrestrial environment or space environment. Components of sound pressure metrology instrument 200 can be formed from silicon, silicon nitride, and the like although other suitable materials, such ceramic, glass, or metal can be used. According to an embodiment, the components of sound pressure metrology instrument 200 are formed using 3D printing although the components of sound pressure metrology instrument 200 can be formed using other methods, such as injection molding or machining a stock material such as block of material that is subjected to removal of material such as by cutting, laser oblation, and the like. Accordingly, sound pressure metrology instrument 200 can be made by additive or subtractive manufacturing. In an embodiment, components of sound pressure metrology instrument 200 are selectively etched to remove various different materials using different etchants and photolithographic masks and procedures. The various layers thus formed can be subjected to joining by bonding to form sound pressure metrology instrument 200 or elements thereof.

The materials and components for the sound pressure metrology instrument 200 can be selected based on the desired performance characteristics of the instrument. For example, the light source 201 can be selected to produce light of a wavelength that is strongly affected by the acoustic medium 205. The optical cavity 203 can be made of a material with a high mechanical stiffness so that it undergoes minimal mechanical deformation during operation of acoustic metrology instrument 200. The photodetector 207 can be sensitive to the wavelength of light produced by the light source 201. The sound pressure metrology instrument 200 can be assembled using a variety of methods, such as soldering, welding, or adhesive bonding. The specific assembly method used can depend on the materials and components of the instrument.

Sound pressure metrology instrument 200 does not require calibration (by comparison of an output of it to an independent measurement of the sound pressure, such as by a calibrated microphone) before use since the sound pressure is determined in the analyzer module 208 in a primary manner. However, components of the sound pressure metrology instrument that measure various quantities (e.g., temperature, wavelength, frequency, voltage, humidity, and the like) that enter into determination of sound pressure metrology instrument can be calibrated.

The following processing conditions and parameters can be used to guide construction of the sound pressure metrology instrument 200. The light source 201 can be operated at a power level that is sufficient to produce a strong signal at the photodetector 207. The optical cavity 203 can be designed to have a high Q factor the light within it interacts strongly with the acoustic medium 205. The photodetector 207 can have an applied bias voltage that is sufficient to produce a high output signal.

Sound pressure metrology instrument 200 has numerous advantageous and unexpected benefits and uses. In an embodiment, a process for determining sound pressure from index of refraction with sound pressure metrology instrument 200 includes: receiving, by optical cavity 203 disposed in acoustic medium 205, acoustic field 204 from sound source 206; receiving, by optical cavity 203, source light 214 from light source 201; interacting source light 214 with acoustic field 204 in optical cavity 203; producing acoustic-modified light 215 from source light 214 in response to interacting with acoustic field 204, such that acoustic-modified light 215 encodes modulations in the index of refraction of acoustic medium 205 inside optical cavity 203 due to acoustic field 204; communicating acoustic-modified light 215 signal to photodetector 207; receiving acoustic-modified light 215 by photodetector 207; producing, by photodetector 207, acoustic-modified signal 216 from acoustic-modified light 215; communicating acoustic-modified signal 216 from photodetector 207 to analyzer module 208; and determining, by analyzer module 208, the sound pressureof acoustic field 204 from the modulations in the index of refraction of acoustic medium 205 encoded inside optical cavity 203 in the acoustic-modified light 215. In an an embodiment, determining sound pressure from index of refraction includes receiving supplemental sensor signal 217 from supplemental sensor 209; and using supplemental sensor signal 217 to improve the fidelity of the determination of the sound pressure.

In an embodiment, analyzer module 208 determines the sound pressure from the index of refraction based on the following equation:

$$\Delta p = \Delta n \left( \frac{dn}{dp} \right)_X^{-1}$$

wherein X is a thermodynamic boundary condition on the derivative and is adiabatic, isothermal, or polytropic; n is index of refraction of acoustic medium; and p is sound pressure.

In an an embodiment, determining sound pressure from index of refraction includes controlling production of the acoustic field by the sound source 206 by a sound source driver 211.

In an an embodiment, measurement of refractive index amplitude occurs by making many brief refractive index measurements, with a repetition rate faster than twice the highest acoustic frequency of interest. In an embodiment, measurement of refractive index amplitude occurs by making many brief refractive index measurements, with a repetition rate that is not faster than twice the highest acoustic frequency of interest, and in which aliasing is accounted for.

In an embodiment, the refractive index shift is measured by measuring the resonance frequency shift of a mode of the optical cavity 203. In an embodiment, the refractive index shift is measured by measuring the resonance frequency shift of more than one mode of the optical cavity 203. In an embodiment, the resonance frequency shift is measured by servo-locking the frequency of laser light to the cavity resonance frequency and measuring the frequency shift applied to the laser light or the error signal of the servo loop. In an embodiment, the frequency shift applied to the laser light is measured by measuring the beat frequency between the laser light and reference laser light on a photodiode. In an embodiment, the reference laser light is produced by an independent laser source than that supplying the laser light that is servo-locked to the optical cavity. In an embodiment, the reference laser light is obtained from the same laser source that is servo-locked to the optical cavity, the reference laser light being extracted from this source at a point in the optical chain prior to the application of the frequency shift.

In an embodiment, the frequency shift applied to the laser light is measured by measuring the voltage applied to a voltage-controlled oscillator. In an embodiment, the servo lock is implemented by detecting a minimum in the amplitude of light reflected from the cavity. In an embodiment, the servo lock is implemented by detecting a maximum in the amplitude of light transmitted by the cavity.

In an embodiment, the resonance frequency shift is measured by measuring the minimum in reflection from the optical cavity of broadband light or a comb of laser lines. In an embodiment, the resonance frequency shift is measured by measuring the maximum in transmission of broadband light or a comb of laser lines.

In determining the sound pressure from the index of refraction analyzer module 208 can determine the sound pressure from the index of refraction based on the following equation:

$$\Delta p = \Delta n \left( \frac{dn}{dp} \right)_X^{-1}$$

wherein X is a condition on the derivative and is adiabatic, isothermal, or polytropic; n is index of refraction of acoustic medium; and p is sound pressure. Whether the conditions on the derivative is adiabatic, isothermal, or polytropic depends on the acoustic frequency and the resonator dimensions and materials. For the adiabatic case, the virial Lorentz-Lorenz relation is $$\frac{n^2-1}{n^2+1} = A_R \rho_v \left(1 + B_R(T)\rho_v + C_R(T)\rho_v^2 + \ldots \right) \approx A_R^* \rho_v$$

wherein $\rho_v$ is the number density of the gas, $A_R$ is the molecular polarizability, $B_R$ and $C_R$ are the refractivity virial coefficients, and $A^*_R$ is the effective molecular polarizability. From the virial Lorentz-Lorenz relation thus written, the derivative of index of refraction n with respect to number density is $$\frac{dn}{d\rho_v} \approx \frac{(n^2+2)^2}{6n}\left(A_R^* + \rho_v \frac{dA_R^*}{d\rho_v}\right).$$

The chain rule provides $$\left.\frac{dn}{dp}\right|_A = \frac{dn}{d\rho_v} \times \left.\frac{d\rho}{dp}\right|_A \times \frac{\rho_v}{\rho} = \left(\frac{dn}{d\rho_v}\right)\frac{1}{v_0^2 \mathcal{M}}$$

wherein ρ is the mass density of the fluid, $v_0$ is the sound speed of the fluid, and M is the molecular weight of the fluid. Accordingly, the sound speed is determined from measurements of the gas pressure and temperature, and using gas property data, or it can be provided by measuring acoustic resonance frequencies of the acoustic enclosure.

It is contemplated that analyzer module 208 in sound pressure metrology instrument 200 and determining therein sound pressure from index of refraction can include the properties, functionality, hardware, and process steps described herein and embodied in any of the following non-exhaustive list:

- a process (e.g., a computer-implemented method including various steps; or a method carried out by a computer including various steps);
- an apparatus, device, or system (e.g., a data processing apparatus, device, or system including means for carrying out such various steps of the process; a data processing apparatus, device, or system including means for carrying out various steps; a data processing apparatus, device, or system including a processor adapted to or configured to perform such various steps of the process);
- a computer program product (e.g., a computer program product including instructions which, when the program is executed by a computer, cause the computer to carry out such various steps of the process; a computer program product including instructions which, when the program is executed by a computer, cause the computer to carry out various steps);
- computer-readable storage medium or data carrier (e.g., a computer-readable storage medium including instructions which, when executed by a computer, cause the computer to carry out such various steps of the process; a computer-readable storage medium including instructions which, when executed by a computer, cause the computer to carry out various steps; a computer-readable data carrier having stored thereon the computer program product; a data carrier signal carrying the computer program product);
- a computer program product including comprising instructions which, when the program is executed by a first computer, cause the first computer to encode data by performing certain steps and to transmit the encoded data to a second computer; or
- a computer program product including instructions which, when the program is executed by a second computer, cause the second computer to receive encoded data from a first computer and decode the received data by performing certain steps.

In an embodiment, analyzer module 208 performs some of the steps for determining the sound pressure and provides one or more outputs to the user (e.g., resonance frequency shift of optical cavity 203), from which the user can readily calculate the sound pressure, the sound pressure thereby being obtained in a primary manner.

In an embodiment, analyzer module 208 includes separate component modules that communicate with each other by removable media, on-screen values that are manually read from some components and entered into others, analog electrical connections, digital electrical connections, wireless connections, optical ethernet connections, and the like.

Sound pressure metrology instrument 200 and processes disclosed herein have numerous beneficial uses since it measures the sound pressure directly and does not require the use of reciprocal microphones being to achieve a primary sound calibration or measurement. Further, sound pressure metrology instrument 200 can provide increased accuracy and primary calibration over a wider range of sound frequencies compared to conventional methods. Sound pressure metrology instrument 200 measures sound pressure that is superior to conventional methods in that sound pressure metrology instrument 200 directly realizes the sound pressure and is applicable to direct primary sound measurements and to calibration of a wide variety of sound sources and sensors, can be more accurate than conventional methods, and can be applicable to a wider range of sound frequencies than conventional methods while providing traceability of sound pressure to quantum standards.

Sound pressure metrology instrument 200 can be a primary sound standard for calibrating a variety of acoustic instruments and can have different shapes and sizes, depending on the instruments and frequency ranges that are measured. Sound pressure metrology instrument 200 can be a refractive-index-based traceable microphone that performs accurate sound measurements without requiring calibration because sound pressure metrology instrument 200 is intrinsically traceable. Furthermore, sound pressure metrology instrument 200 can calibrate other devices in a variety of acoustic field configurations.

The sound pressure metrology instrument 200 can be used in a variety of applications. For example, the sound pressure metrology instrument 200 can be used to measure the sound pressure level of a variety of acoustic sources, such as loudspeakers, musical instruments, and machinery. The sound pressure metrology instrument 200 may also be used to measure the sound pressure level of environmental noise, such as traffic noise, construction noise, and industrial noise. The sound pressure metrology instrument 200 may also be used to calibrate microphones.

The articles and processes herein are illustrated further by the following Example, which is non-limiting.

EXAMPLE

This example describes low-uncertainty sound measurement using pressure-driven oscillation of the refractive index of air inside a combined acoustical and optical cavity. Here, primary sound measurement involves the pressure-driven oscillation of the refractive index at the acoustic frequency in an optical cavity and provides low uncertainty over a wide range of acoustic frequencies.

For implementation of a primary sound standard, generate steady single-frequency sound fields in an acoustic resonator or in an acoustic coupler. Sound is generated at one end by a source, and a microphone to be calibrated is mounted in the opposite end. In the resonator, standing plane waves are generated at integer multiples of the frequency for which the resonator end-to-end length is equal to the acoustic wavelength. For even multiples, the midplane location of the optical cavity results in the optical cavity seeing the same pressure amplitude as occurs at the ends of the resonator. For a Fabry-Perot cavity of length l containing a gas with refractive index n, the sensitivity of the cavity resonance frequency $v_r$ to pressure p is $$\frac{\partial y}{\partial x} = -\upsilon_r\left(\frac{1}{n}\frac{\partial n}{\partial p} + \frac{1}{l}\frac{\partial l}{\partial p}\right). \tag{1}$$

At a wavelength of 1550 nm and standard atmospheric conditions, the sensitivity of the refractive index to pressure is typically $$\frac{1}{n}\left(\frac{\partial n}{\partial p}\right)_A = 1.9\times10^{-9}\ \text{Pa}^{-1}.$$

For 1550 nm light ($v_r$=1.94×$10^{14}$ Hz), a sound pressure amplitude of a few Pascals results in a cavity resonance frequency shift amplitude of a few megahertz. Such a frequency shift is measurable to high resolution using a narrow-linewidth optical cavity. The acoustic pressure can cause the cavity frequency to change via the effect of the pressure on the cavity length l, given the finite mechanical impedance of the cavity structure. This causes a small error that can be minimized by mechanical design and largely compensated for by modeling. The cavity frequency shift can be read out using a lock-based readout in which the Pound-Drever-Hall method is used to servo the laser frequency to the cavity resonance frequency. In this example, an acousto-optic frequency shifter is used. A high-repetition rate frequency counter tracks the frequency shift in time. The laser output is stabilized at the acoustic frequency prior to injection into the cavity lock.

The processes described herein can be embodied in, and fully automated via, software code modules executed by a computing system that includes one or more general purpose computers or processors. The code modules can be stored in any type of non-transitory computer-readable medium or other computer storage device. Some or all of the methods may alternatively be embodied in specialized computer hardware. In addition, the processes referred to herein can be implemented in hardware, software, firmware, or a combination thereof.

Many other variations than those described herein can be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

Any processes and algorithm elements described or used in connection with the embodiments disclosed herein can be implemented as electronic hardware, computer software, firmware, or combinations thereof. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described or used in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein can be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile.

While one or more embodiments have been shown and described, modifications and substitutions can be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix (s)

as used herein is intended to include both the singular and the plural of the term that it modifies, thereby including at least one of that term (e.g., the mode(s) includes at least one modes). Option, optional, or optionally means that the subsequently described event or circumstance can or cannot occur, and that the description includes instances where the event occurs and instances where it does not. As used herein, combination is inclusive of assemblages, collection of elements, blends, mixtures, alloys, and the like.

As used herein, a combination thereof refers to a combination comprising at least one of the named constituents, components, compounds, or elements, optionally together with one or more of the same class of constituents, components, compounds, or elements.

All references are incorporated herein by reference.

The use of the terms "a," "an," and "the" and similar referents in the context of describing the invention (especially in the context of the following claims) are to be construed to cover both the singular and the plural, unless otherwise indicated herein or clearly contradicted by context. It can further be noted that the terms first, second, primary, secondary, and the like herein do not denote any order, quantity, or importance, but rather are used to distinguish one element from another. It can also be understood that, although the terms first, second, etc. are, in some instances, used herein to describe various elements, these elements should not be limited by these terms. For example, a first current could be termed a second current, and, similarly, a second current could be termed a first current, without departing from the scope of the various described embodiments. The first current and the second current are both currents, but they are not the same condition unless explicitly stated as such.

The modifier about used in connection with a quantity is inclusive of the stated value and has the meaning dictated by the context (e.g., it includes the degree of error associated with measurement of the particular quantity). The modifier nearly used in connection with a quantity is inclusive of the stated value and has the meaning that the deviation from the stated value is small in magnitude compared to the stated value. The conjunction or is used to link objects of a list or alternatives and is not disjunctive; rather the elements can be used separately or can be combined together under appropriate circumstances.

What is claimed is:

1. A sound pressure metrology instrument for determining sound pressure from index of refraction, the sound pressure metrology instrument comprising: a light source that produces source light and communicates the source light to an optical cavity; the optical cavity in optical communication with the light source, in acoustic communication with a sound source, and in optical communication a photodetector, such that an acoustic medium is disposed within an optical mode volume of the optical cavity and such that the optical cavity; receives an acoustic field from the sound source; receives the source light from the light source; produces acoustic-modified light from the source light in response to the source light interacting with the acoustic field in the optical cavity, such that the acoustic-modified light encodes modulations in the index of refraction of the acoustic medium inside the optical cavity due to the acoustic field; and optically communicates the acoustic-modified light to the photodetector; the photodetector in optical communication with the optical cavity and in electrical communication with an analyzer module and that receives the acoustic modified light from the optical cavity, produce an acoustic-modified signal from the acoustic-modified light, and communicates the acoustic-modified signal to the analyzer module; the analyzer module in electrical communication with the photodetector and that receives the acoustic-modified signal from the photodetector and determines the sound pressure of the acoustic field produced by the sound source from the modulations in the index of refraction of the acoustic medium inside the optical cavity encoded in the acoustic-modified light; and an acoustic enclosure in which is disposed the optical cavity, the acoustic medium, the sound source, and the acoustic field, wherein the acoustic enclosure comprises an acoustic resonator, wherein the acoustic enclosure supports a standing acoustic wave at an acoustic wavelength $\lambda_{ac}$=L/N, wherein N is an integer, and L is a distance of separation of the sound source and a microphone that are disposed on opposing ends of the acoustic enclosure.

2. The sound pressure metrology instrument of claim 1, further comprising a supplemental sensor in communication with the analyzer module and that produces supplemental sensor signal and communicates the supplemental sensor signal to the analyzer module.

3. The sound pressure metrology instrument of claim 2, wherein the supplemental sensor comprises a temperature sensor, humidity sensor, pressure sensor, mass spectrometer, chromatograph, wavemeter, a carbon dioxide concentration sensor, an accelerometer, a laser vibrometer, or a displacement sensor that measures a temperature, humidity, static background pressure, or composition of the acoustic medium in the optical cavity or optical frequency or wavelength of the source light or the acoustic-modified light.

4. The sound pressure metrology instrument of claim 2, wherein the supplemental sensor:

measures a temperature, humidity, static background pressure, or composition of the acoustic medium in the optical cavity or optical frequency or wavelength of the source light or the acoustic-modified light, and communicates the temperature, humidity, static background pressure, or composition of the acoustic medium in the optical cavity or optical frequency or wavelength of the source light or the acoustic-modified light as the supplemental sensor signal to the analyzer module.

5. The sound pressure metrology instrument of claim 2, wherein the analyzer module receives the supplemental sensor signal from the supplemental sensor, and the analyzer module uses the supplemental sensor signal to improve the fidelity of the determination of the sound pressure.

6. The sound pressure metrology instrument of claim 1, wherein the analyzer module determines the sound pressure from the index of refraction based on the following equation:

$$\Delta p = \Delta n \left( \frac{dn}{dp} \right)_X^{-1}$$

wherein X is a condition on the derivative and is adiabatic, isothermal, or polytropic; n is index of refraction of acoustic medium; and p is sound pressure.

7. The sound pressure metrology instrument of claim 1, further comprising a sound source driver in electrical communication with the sound source and that provides a driver signal, communicates the driver signal to the sound source, and controls production of the acoustic field by the sound source with the driver signal.

8. Sound pressure metrology instrument for determining sound pressure from index of refraction, the sound pressure metrology instrument comprising: a light source that produces source light and communicates the source light to an optical cavity; the optical cavity in optica al communication with the light source, in acoustic communication with a sound source, and in optical communication a photodetector, such that an acoustic medium is disposed within an optical mode volume of the optical cavity and such that the optical cavity; receives an acoustic field from the sound source; receives the source light from the light source; produces acoustic-modified light from the source light in response to the source light interacting with the acoustic field in the optical cavity, such that the acoustic-modified light encodes modulations in the index of refraction of the acoustic medium inside the optical cavity due to the acoustic field, and optically communicates the acoustic-modified light to the photodetector; the photodetector in optical communication with the optical cavity and in electrical communication with an analyzer module and that receives the acoustic-modified light from the optical cavity, produces an acoustic-modified signal from the acoustic-modified light, and communicates the acoustic-modified signal to the analyzer module; the analyzer module in electrical communication with the photodetector and that receives the acoustic-modified signal from the photodetector and determines the sound assure of the acoustic field produced by the sound source from the modulations in the index of refraction of the acoustic medium inside the optical cavity encoded in the acoustic-modified light; and an acoustic enclosure in which is disposed the optical cavity, the acoustic medium, the sound source, and the acoustic field, wherein the acoustic enclosure comprises an acoustic coupler, wherein the acoustic field has constant acoustic pressure in the acoustic enclosure such that $\lambda_{ac}$<<L/N, wherein N is an integer, and L is a distance of separation of the sound source and a microphone that are disposed on opposing ends of the acoustic enclosure.

9. A sound pressure metrology instrument for determining sound pressure from index of refraction, the sound pressure metrology instrument comprising: a light source that produces source light and communicates the source light to an optical cavity; the optical cavity in optical communication with the light source, ac ustic communication with a sound source, and in optical communication a photodetector, such hat an acoustic medium is disposed within an optical mode volume of the optical cavity and such that the optical cavity; receives an acoustic field from the sound source; receives the source light from the light source; produces acoustic-modified light from the source light in response to the source light interacting with the acoustic field in the optical cavity, such that the acoustic-modified Right encodes modulations in the index of refraction of the acoustic medium inside the optical cavity due to the acoustic field; and optically communicates the acoustic-modified light to the photodetector; the photodetector in optical communication with the optical cavity and in electrical communication with an analyzer module and that receives the acoustic-modified light from the optical cavity, produces an acoustic-modified signal from the acoustic-modified light, and communicates the acoustic-modified signal to the analyzer module; the analyzer module in electrical communication with the photodetector and that receives the acoustic-modified signal from the photodetector and determines the sound pressure of the acoustic field produced by the sound source from the modulations in the index of refraction of the acoustic medium inside optical cavity encoded in the acoustic-modified light; and a microphone in acoustic communication with the sound source such that the optical cavity is acoustically interposed between the sound source and the microphone, such that the microphone receives the acoustic field that propagates through the optical cavity from the sound source, produces a microphone signal from the acoustic field, and communicates the microphone signal to a microphone receiver.

10. The sound pressure metrology instrument of claim 9, further comprising the microphone receiver in electrical communication with the microphone and that receives the microphone signal from the microphone, produces an acoustic signal from the microphone signal, and communicates the acoustic signal to the analyzer module, such that the sound pressure measured by the analyzer module is compared with the microphone signal from the microphone to calibrate the sensitivity of the microphone.

11. A process for determining sound pressure from index of refraction, the process comprising: receiving, by an optical cavity comprising an acoustic medium disposed within an optical mode volume of the optical cavity, an acoustic field from a sound source; receiving, by the optical cavity, source light from a light source; interacting source light with the acoustic field in the optical cavity; producing an acoustic-modified light from the source light in response to interacting with the acoustic field, such that the acoustic-modified light encodes modulations in the index of refraction of the acoustic medium inside the optical cavity due to the acoustic field; communicating the acoustic-modified light signal to a photodetector; receiving the acoustic-modified light by the photodetector; producing, by the photodetector, an acoustic-modified signal from the acoustic-modified light; communicating the acoustic-modified signal from the photodetector to an analyzer module; determining, by the analyzer module, the sound pressure of the acoustic field from the modulations in the index of refraction of the acoustic medium encoded inside the optical cavity in the acoustic-modified light and receiving the acoustic field by a microphone and producing a microphone signal from the acoustic field.

12. The process of claim 11, further comprising:

receiving a supplemental sensor signal from a supplemental sensor;

using the supplemental sensor signal to improve the fidelity of the determination of the sound pressure level.

13. The process of claim 11, wherein the analyzer module determines the sound pressure level from the index of refraction based on the following equation:

$$\Delta p = \Delta n\left(\frac{dn}{dp}\right)_X^{-1}$$

wherein X is a condition on the derivative and is adiabatic, isothermal, or polytropic; n is index of refraction of acoustic medium; and p is sound pressure.

14. The process of claim 11, further comprising:

controlling production of the acoustic field by the sound source by a sound source driver.

15. The process of claim 11, further comprising:

receiving the microphone signal by a microphone receiver and producing an acoustic signal from the microphone signal.

16. The process of claim 11, further comprising:

communicating the acoustic signal to the analyzer module from the microphone receiver; and comparing, by the analyzer module, the sound pressure level measured by the analyzer module with the microphone signal from the microphone to calibrate the sensitivity of the microphone.

* * * * *